US012645624B2

(12) United States Patent
Hu et al.

(10) Patent No.: US 12,645,624 B2
(45) Date of Patent: Jun. 2, 2026

(54) BOARD MANAGEMENT SYSTEM, METHOD, AND APPARATUS, AND DEVICE

(71) Applicant: HUAWEI TECHNOLOGIES CO., LTD., Shenzhen (CN)

(72) Inventors: Renjie Hu, Dongguan (CN); Yuanjun Niu, Xi'an (CN); Qin Li, Dongguan (CN); Haiqiang Ju, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/816,341

(22) Filed: Aug. 27, 2024

(65) Prior Publication Data

US 2024/0419618 A1       Dec. 19, 2024

Related U.S. Application Data

(63) Continuation of application No. PCT/CN2023/078408, filed on Feb. 27, 2023.

(30) Foreign Application Priority Data

Feb. 28, 2022    (CN) ........................ 202210188470.X

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
None
See application file for complete search history.

(56) References Cited

U.S. PATENT DOCUMENTS

| 6,389,464 B1 | 5/2002 | Krishnamurthy et al. |
| 9,946,552 B2 * | 4/2018 | Balakrishnan ........ G06F 3/0604 |
| 10,761,858 B2 * | 9/2020 | Ganesan ............ G06F 9/44505 |
| 11,210,252 B1 * | 12/2021 | Robertson .............. G06F 9/466 |

(Continued)

FOREIGN PATENT DOCUMENTS

| CN | 1783799 A | 6/2006 |
| CN | 102355365 A | 2/2012 |

(Continued)

OTHER PUBLICATIONS

Extended European Search Report in European Appln. No. 23759320.7, mailed on May 2, 2025, 7 pages.

(Continued)

*Primary Examiner* — Elias Mamo

(74) *Attorney, Agent, or Firm* — Fish & Richardson P.C.

(57) ABSTRACT

Example board management systems, methods, and apparatuses are provided. An example board management system includes a baseboard management controller and a computing device board. The computing device board includes a memory and a component manager, where the memory records management information of the computing device board. The memory and the component manager are connected to the baseboard management controller through the management bus. The baseboard management controller is configured to obtain the management information from the memory, and manage the computing device board based on the management information by interacting with the component manager.

17 Claims, 10 Drawing Sheets

(56) References Cited

U.S. PATENT DOCUMENTS

| | | | |
|---|---|---|---|
| 11,354,215 B2 * | 6/2022 | Yang .................... | G06F 11/3006 |
| 11,914,492 B2 * | 2/2024 | Gupta .................... | G06F 1/206 |
| 2014/0195657 A1 | 7/2014 | Bhatia et al. | |
| 2014/0344431 A1 * | 11/2014 | Hsu .................... | H04L 41/0213 |
| | | | 709/223 |
| 2016/0291654 A1 | 10/2016 | Iyer et al. | |
| 2019/0004901 A1 * | 1/2019 | Ryan .................... | G06F 1/3253 |

FOREIGN PATENT DOCUMENTS

| | | | |
|---|---|---|---|
| CN | 102707976 A | 10/2012 | |
| CN | 106850286 A | 6/2017 | |
| CN | 109471770 A | 3/2019 | |
| CN | 110825204 A | 2/2020 | |
| CN | 111026588 A | 4/2020 | |
| CN | 111459863 A | 7/2020 | |
| CN | 111984292 A | 11/2020 | |
| CN | 113360165 A | 9/2021 | |

OTHER PUBLICATIONS

International Search Report and Written Opinion in International Appln. No. PCT/CN2023/078408, mailed on May 31, 2023, 17 pages (with English translation).

\* cited by examiner

| Operation code (Opcode) | | | | Component parameter (parameter) |
|---|---|---|---|---|
| Function (Function) | Command (Command) | MS | RW | |
| Definitions are as follows:<br><br>1: extension component<br>2: storage unit<br>3: basic computing unit<br>4: memory expansion unit<br>0: universal command | Preliminary definition | 0: multiple-read<br>1: single-read | 0: read<br>1: write | Identify a component on which an operation is performed |

FIG. 3

| S | Component address (device Address) | WR | A | Command code (command code) | A | Length (length) | Operation code (op code)-1 | A | Operation code (op code)-2 | A | Operation code (op code)-3 | A | Component parameter (Parameter) | CRC | A | P |
|---|---|---|---|---|---|---|---|---|---|---|---|---|---|---|---|---|
| 1 bit | 7 bits | 1 bit | 1 bit | 0x20: 8 bits | 1 bit | 8 bits | 8 bits | 1 bit | 8 bits | 1 bit | 8 bits | 1 bit | 8 bits | 8 bits | 1 bit | 1 bit |

FIG. 4A

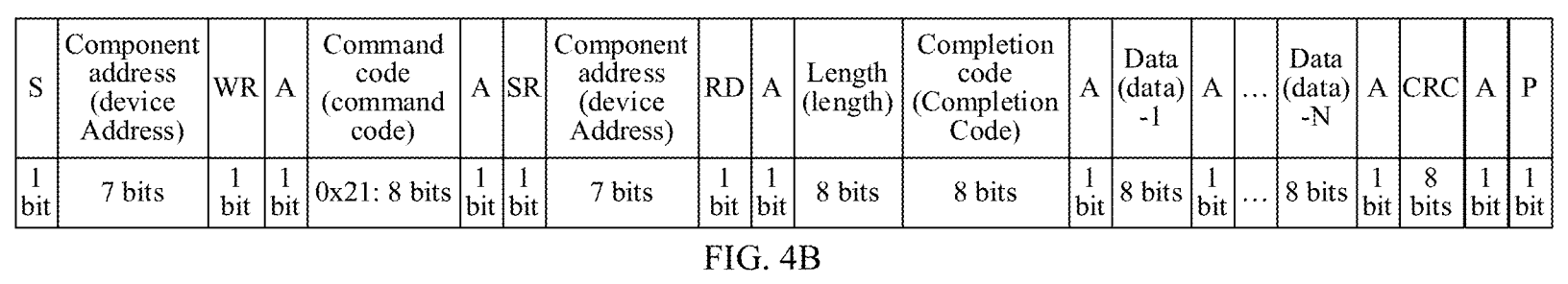

| S | Component address (device Address) | WR | A | Command code (command code) | A | SR | Component address (device Address) | RD | A | Length (length) | Completion code (Completion Code) | A | Data (data) -1 | A | ... | Data (data) -N | A | CRC | A | P |
|---|---|---|---|---|---|---|---|---|---|---|---|---|---|---|---|---|---|---|---|---|
| 1 bit | 7 bits | | 1 bit | 0x21: 8 bits | 1 bit | 1 bit | 7 bits | | 1 bit | 8 bits | 8 bits | | 8 bits | 1 bit | ... | 8 bits | 1 bit | 8 bits | 1 bit | 1 bit |

FIG. 4B

| S | Component address (device Address) | WR | A | Command code (command code) | A | Length (length) | Operation code (op code)-1 | A | Operation code (op code)-2 | A | Operation code (op code)-3 | A | Component parameter (Parameter) | A | Data (data)-1 | A | ... | Data (data)-N | CRC | A | P |
|---|---|---|---|---|---|---|---|---|---|---|---|---|---|---|---|---|---|---|---|---|---|
| 1 bit | 7 bits | 1 bit | 1 bit | 0x22: 8 bits | 1 bit | 8 bits | 8 bits | 1 bit | 8 bits | 1 bit | 8 bits | 1 bit | 8 bits | 1 bit | 8 bits | 1 bit | ... | 8 bits | 8 bits | 1 bit | 1 bit |

FIG. 4C 1    2    3         4         5    6

BOARD MANAGEMENT SYSTEM, METHOD, AND APPARATUS, AND DEVICE

CROSS-REFERENCE TO RELATED APPLICATIONS

This application is a continuation of International Application No. PCT/CN2023/078408, filed on Feb. 27, 2023, which claims priority to Chinese Patent Application No. 202210188470.X, filed on Feb. 28, 2022. The disclosures of the aforementioned applications are hereby incorporated by reference in their entireties.

TECHNICAL FIELD

This application relates to the field of server technologies, and in particular, to a board management system, method, and apparatus, and a device.

BACKGROUND

In the 1980s, Microsoft and Intel formed the Wintel alliance to promote development of the personal computer (PC) industry. The two companies work closely in the PC industry to drive the computing industry to grow rapidly, which gradually affects other computing devices such as servers. The computing devices such as the servers have many application scenarios and configuration types, and have a high requirement on reliability. In addition, the servers have a huge commercial volume and is the focus of open industry ecosystem construction.

Conventional servers are used as an example. Currently, the industry ecosystem of the conventional servers has the following characteristics:

The standardization level is not high. The conventional servers already have some foundation for component standardization. For example, components, such as a memory module, a solid-state drive (SSD), and a peripheral component interconnect express (PCIe) card, already have their own standards. The component standardization has contributed a lot to the industry ecosystem and resource sharing, and has reduced development work of some vendors of complete servers. However, standardized components account for a small proportion in an entire server, which means that a lot of manpower needs to be input into server mainboard development to complete adaptation of standardized components and non-standard components.

Therefore, standardization of server components needs to be enhanced. The standardization of the server components relates to all aspects of the servers. Out-of-band management (Out-of-band management) of a server refers to maintaining devices such as the server through an independent management channel. The out-of-band management of the server allows a system administrator to remotely monitor and manage the server. The out-of-band management of the server mainly relates to management and monitoring of a working environment of components (such as a processor, a memory, and a hard disk) on a server board. The working environment of the components includes but is not limited to information such as a temperature, an operating voltage, a fan, and a power supplying status that is of a power supply. This ensures that the components in the server can work in a proper working environment.

The out-of-band management of the servers is usually implemented by a baseboard management controller (BMC). To implement the out-of-band management, the baseboard management controller needs to be connected to a server board, so as to be connected to each component on the server board. However, there are more types and categories of processors, architectures of server boards on which different processors are deployed are also different, and these different server boards do not have unified interfaces for connection to the baseboard management controller. As a result, out-of-band management of each type of server board, the baseboard management controller needs to carry out a large amount of adaptation work, and the rate of reusing the baseboard management controller for different types of server boards is low.

SUMMARY

This application provides a board management system, method, and apparatus, and a device, to provide an out-of-band management BMC and method with higher adaptability.

According to a first aspect, an embodiment of this application provides a board management system, where the board management system includes a baseboard management controller and a computing device board. The board management system may be deployed in a computing device, where the computing device may be a server, a personal computer, or the like.

The baseboard management controller may be connected to the computing device board through a management bus. The computing device board includes a memory and a component manager, where the memory records management information of the computing device board. Inside the computing device board, the memory and the component manager may be connected to the baseboard management controller through the management bus.

The baseboard management controller may obtain management information from the memory through the management bus, and manages, based on the management information, the computing device board by interacting with the component manager.

The foregoing system ensures a simple connection relationship between the baseboard management controller and the computing device, so that the baseboard management controller is adapted to computing device boards of different structures. In this way, management of the computing device board can be simplified and is more efficient.

In a possible implementation, the computing device board further includes a first-type component, where the first-type component is connected to the component manager, and the component manager may obtain working information of the first-type component. The baseboard management controller may obtain the working information of the first-type component from the component manager through the management bus.

The foregoing system allows the baseboard management controller to conveniently obtain the working information of the first-type component from the device manager when the baseboard management controller does not need to be connected to the first-type component. A manner of obtaining the working information of the first-type component is simple and efficient, thereby avoiding a large amount of adaptation work that the baseboard management controller needs to do to match different computing device boards. Therefore, an out-of-band management process is simplified.

In a possible implementation, the computing device board further includes a second-type component, where the second-type component may be connected to the baseboard management controller without the component manager, and the second-type component may be directly connected to the baseboard management controller through the management bus. The baseboard management controller may directly interact with the second-type component through the management bus, to obtain working information of the second-type component.

The foregoing system allows the management bus to be connected to not only the memory and the component manager, but also the second-type component. This connection manner is simple, and saves too much adaptation work for the baseboard management controller, thereby expanding application scenarios.

In a possible implementation, the management information is information required by the baseboard management controller to manage the computing device board. That is, the management information may be pre-stored in the memory. Specific content of the management information is not limited in embodiments of this application, and all information required for managing the computing device board is applicable to embodiments of this application. For example, the management information includes a part or all of the following: property information of the computing device board, topological information of the computing device board, property information of the first-type component, and property information of the second-type component.

With the foregoing system, the management information is pre-stored in the memory, and then the baseboard management controller can obtain the management information only by performing a simple loading operation, thereby making a manner of obtaining the management information simpler.

In a possible implementation, the baseboard management controller may interact with the component manager. A manner of interaction between the baseboard management controller and the component manager is not limited in embodiments of this application. For example, the baseboard management controller may interact with the component manager by using a command word, to ensure high interaction efficiency. A universal command word may be configured for different computing device boards. In this way, the baseboard management controller may be adapted to different computing device boards, thereby improving adaptability of the baseboard management controller and a management method.

In a possible implementation, the baseboard management controller may control the first-type component. For example, the baseboard management controller may deliver a control command to the component manager, to indicate the component manager to control the first-type component. The baseboard management controller may directly control the first-type component, and the baseboard management controller may deliver a control command to the second-type component through the management bus, to control the second-type component.

The baseboard management controller upgrades the first-type component or the component manager. For example, the baseboard management controller may transfer an upgrade file for the first-type component to the component manager, to indicate to upgrade the first-type component. After obtaining the upgrade file for the first-type component, the component manager upgrades the first-type component by using the upgrade file for the first-type component. The baseboard management controller may further transfer an upgrade file for the component manager to the component manager, to indicate to upgrade the component manager.

Certainly, the baseboard management controller may also directly upgrade the second-type component through the management bus.

With the foregoing system, the baseboard management controller controls or upgrades a component through the management bus or the component manager, thereby simplifying a manner of control and upgrading, and ensuring efficient management of the computing device board.

In a possible implementation, a type of the memory is not limited in embodiments of this application. For example, the memory may be an electrically erasable programmable read-only memory with a small size and a higher integration level.

In a possible implementation, a specific structure of the component manager is not limited in embodiments of this application, and all modules that can implement component management are applicable to embodiments of this application. For example, the component manager is a complex programmable logic device or a microcontroller unit. The specific structure of the component manager is diversified, and is applicable to different computing device boards, thereby expanding application scenarios.

In a possible implementation, the management bus may be an inter-integrated circuit bus or a serial peripheral interface bus, or may be another type of bus. There are many types of applicable management buses, so that the baseboard management controller may be connected to different types of computing device boards, that is, the baseboard management controller is adapted to different types of computing device boards.

According to a second aspect, an embodiment of this application provides a board management method. The method is used to manage a computing device board. For beneficial effects, refer to the descriptions of the first aspect. Details are not described herein again. The computing device board includes a memory and a component manager, where the memory records management information of the computing device board. According to the method, a baseboard management controller may obtain the management information from the memory through a management bus. After obtaining the management information, the baseboard management controller may interact with the component manager based on the management information through the management bus, to manage the computing device board.

In a possible implementation, the computing device board includes a first-type component, where the first-type component may be connected to the component manager, and the baseboard management controller may obtain working information of the first-type component from the component manager through the management bus.

In a possible implementation, the computing device board includes a second-type component, where the second-type component may be directly connected to the baseboard management controller through the management bus, and the baseboard management controller may obtain working information of the second-type component from the second-type component through the management bus.

In a possible implementation, the management information includes a part or all of the following: property information of the computing device board, topological information of the computing device board, property information of the first-type component, and property information of the second-type component.

In a possible implementation, when interacting with the component manager through the management bus, the baseboard management controller may interact with the component manager through the management bus by using a command word.

In a possible implementation, the baseboard management controller controls the first-type component by using the component manager, and may further upgrade the first-type component by using the component manager. For example, the baseboard management controller transfers an upgrade file for the first-type component to the component manager, to indicate to upgrade the first-type component. After receiving the upgrade file for the first-type component, the component manager may upgrade the first-type component by using the upgrade file for the first-type component. The baseboard management controller may also upgrade or control the component manager or the second-type component.

In a possible implementation, the management bus is an I2C bus or an SPI bus.

According to a third aspect, an embodiment of this application further provides a board management apparatus. The board management apparatus has a function of implementing behavior in the method example in the second aspect. For beneficial effects, refer to the descriptions of the first aspect. Details are not described herein again. The function may be implemented by hardware, or may be implemented by hardware executing corresponding software. The hardware or software includes one or more modules corresponding to the function. In a possible design, a structure of the board management apparatus includes a request obtaining unit and a management unit, and optionally, further includes an upgrade unit. These units may perform the corresponding functions in the method example in the second aspect. For details, refer to the detailed descriptions in the method example. Details are not described herein again.

According to a fourth aspect, an embodiment of this application further provides a baseboard management controller. The baseboard management controller has a function of implementing behavior in the method example in the second aspect. For beneficial effects, refer to the descriptions of the second aspect. Details are not described herein again. A structure of the baseboard management controller includes a processor. Optionally, the baseboard management controller may further include a memory. The processor is configured to support a board management apparatus in performing the corresponding method i in the second aspect. The memory is coupled to the processor, and stores computer program instructions necessary for a communication apparatus. The processor may invoke the computer program instructions to perform the corresponding method in the method in the second aspect.

According to a fifth aspect, an embodiment of this application further provides a computing device. The computing device includes a baseboard management controller and a computing device board. The computing device board may include components such as a processor and a memory. The baseboard management controller has a function of implementing behavior in the method example in the second aspect. For beneficial effects, refer to the descriptions of the first aspect. Details are not described herein again.

According to a sixth aspect, this application further provides a computer-readable storage medium. The computer-readable storage medium stores instructions. When the instructions are run on a computer, the computer is enabled to perform the method according to the second aspect and the possible implementations in the second aspect.

According to a seventh aspect, this application further provides a computer program product including instructions. When the computer program product runs on a computer, the computer is enabled to perform the method according to the first aspect and the possible implementations in the first aspect.

According to an eighth aspect, this application further provides a computer chip. The chip is connected to a memory, and the chip is configured to read and execute a software program stored in the memory, to perform the method according to the second aspect and the possible implementations in the second aspect.

BRIEF DESCRIPTION OF DRAWINGS

FIG. 3 is a schematic diagram of a structure of a command word according to this application;

FIG. 4A is a schematic diagram of a structure of a read request according to this application;

FIG. 4B is a schematic diagram of a structure of a read response according to this application;

FIG. 4C is a schematic diagram of a structure of a write request according to this application;

DESCRIPTION OF EMBODIMENTS

Figure 1:
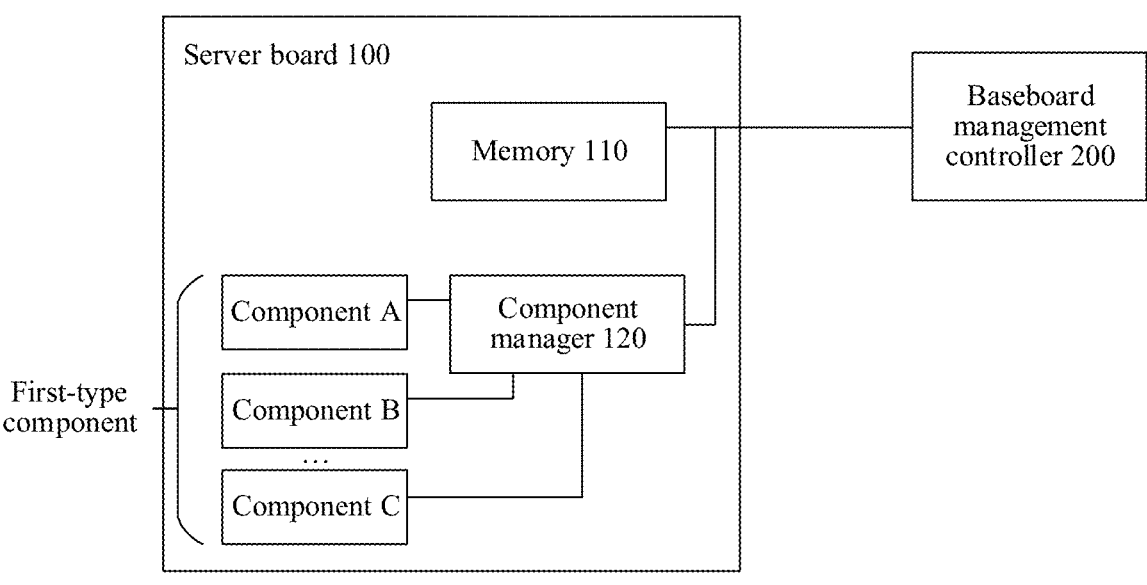
FIG. 1 is a schematic diagram of an architecture of a board management system according to this application.

Development of conventional server mainboards is subject to a high technical threshold. In addition to a central processing unit (CPU), a mainboard also provides functions such as bus fan-out, power supply fan-out, and maintenance and management. CPU-related circuits on the mainboards are all designed by CPU vendors for reference. However, different CPU vendors provide different reference designs, which means that a lot of resources and time need to be input into mainboard development and design. To meet a requirement for rapid upgrade of computing products such as servers, vendors of complete servers need to invest a lot in differentiated innovation. However, competition is usually focused on specifications of low-level hardware. In this case, the vendors of complete servers not only fail to meet customers' requirements for diversified scenarios and computing capabilities, but also are forced to join low-efficiency homogenized competition. Amid a trend of computing capability diversification, more processor vendors emerge and launch more processor products of different architectures. As a result, various types of processors are iterated at a faster pace. At the same time, power consumption of the processors keeps increasing, and a heat dissipation technology for conventional servers can no longer meet requirements. In addition, to improve system performance, new medium types (for example, Intel has launched the 3D XPoint non-volatile medium) and forms have been launched in the industry. These new medium types and forms also need support and adaptation of new architectures. To develop servers that are adapted to the foregoing technology, the vendors of complete servers need to input a huge development workload. However, due to product differences, a design solution for a same mainboard or system cannot be reused. Therefore, the entire industry has set higher requirements on cross-architecture component sharing, cross-generation evolution, time to market (TTM), reduction of total cost of operation (TCO), and the like. To spur industry development, a more open and standardized server architecture needs to be built, to improve development efficiency, boost component reuse, and provide more flexibility and differentiation.

This application proposes an innovative peer-to-peer interconnection architecture (which may also be referred to as a new server architecture or a new architecture). In this architecture, a conventional mainboard is divided into a basic computing unit (BCU) and an extension unit (EXU). The basic computing unit and the extension unit are used together to support specifications and forms of the mainboard required in different scenarios. A same computing device may include one basic computing unit and one extension unit, or a same computing device may include a plurality of basic computing units and one extension unit, or a same computing device may include one basic computing unit and a plurality of extension units. The basic computing unit includes a CPU, a double data rate (DDR) SDRAM, and a related power supply. The basic computing unit provides universal computing capabilities and extension interfaces such as peripheral storage, input/output (I/O), and acceleration. The basic computing unit supports different series of CPUs, such as Kunpeng®, Intel®, and AMD®. Optionally, the basic computing unit supports a heterogeneous processor, to be specific the basic computing unit may support different types of processors. For example, the basic computing unit supports a CPU, and any one or any combination of processors such as an application-specific integrated circuit (ASIC), a programmable logic device (PLD), a complex programmable logic device (CPLD), a field-programmable gate array (FPGA), a generic array logic (GAL), a system on chip (SoC), a software-defined infrastructure (SDI) chip, and an artificial intelligence (AI) chip.

Further, based on a service requirement and a hardware property, embodiments of this application provide at least six different forms of basic computing units, and these basic computing units are respectively configured for different computing performance and memory requirements. For ease of description, the six forms of basic computing units are respectively referred to as A1, A2, B1, B2, C1, and C2. In addition, in embodiments of this application, "P" represents a quantity of processors, where P is an integer greater than 0, and "DPC" represents a dual in-line memory module per channel (DIMM Per Channel). For example, a basic computing unit in a form of A1 supports one processor, with one DIMM per channel (1P1DPC for short). A basic computing unit in a form of A2 supports one processor, with one or two DIMMs per channel (1P2DPC or 1P1DPC for short). A basic computing unit in a form of B1 supports two processors, with one DIMM per channel (2P1DPC for short), or supports one processor, with one or two DIMMs per channel (1P2DPC or 1P1DPC for short). A basic computing unit in a form of B2 supports two processors, with one or two DIMMs per channel (2P2DPC or 2P1DPC for short), or supports one processor, with one or two DIMMs per channel (1P2DPC or 1P1DPC for short). A basic computing unit in a form of C1 supports four processors, with one DIMM per channel (4P1DPC for short), or supports two processors, with one or two DIMMs per channel (2P2DPC or 2P1DPC for short). A basic computing unit in a form of C2 supports four processors, with one or two DIMMs per channel (4P2DPC or 4P1DPC for short), or supports two processors, with one or two DIMMs per channel (2P2DPC or 2P1DPC for short). With the development of technologies, a CPU package size, a quantity of memory channels, and a quantity of DIMMs may change, but the standard size and mounting hole positions of a mainboard remain unchanged. This ensures that a basic computing unit is ready for cross-generation and cross-series evolution in a compatible manner. For example, when the basic computing unit in a form of B2 has an eight-channel DDR per CPU, the basic computing unit supports 2P2DPC (2P32DIMMs). After the quantity of CPU memory channels increases to 12, 2P2DPC (2P48DIMMs) cannot be implemented. The form of B2 may support 2P1DPC (2P24DIMMs), and 2P2DPC (2P48DIMMs) may be implemented by using another form such as C1. Because the mounting hole positions and the basic computing unit size are standard, replacement and installation may be performed directly.

The extension unit includes a baseboard management controller (BMC) chip, and is a management extension of the basic computing unit. As a management center of an entire system, the extension unit provides functions such as device management, security management, energy efficiency management, and reliability management. The BMC is short for baseboard management controller. Optionally, the extension unit may further include a management system and a bridge chip (for example, a platform controller hub (PCH) of an Intel system).

In a new architecture, the basic computing unit is in communication connection with a component through a high-speed bus such as a PCIe, a compute express link (CXL), or a unified bus (UB, or Ubus), and is connected to the extension unit through a management interface. In a specific implementation, a specific manner of connection between the basic computing unit and the component and between the basic computing unit and the extension unit includes: soft connection using a cable, or hard connection using a connector. Further, the component is a collective term of a type of electronic component or electronic device. In terms of functions, the component includes a storage unit (STU), an I/O unit (IOU), an acceleration unit (ACU), a memory expansion unit (MEU), a heat dissipation component, a computing component, a management component, and the like. The basic computing unit supports different series of CPUs, such as Kunpeng®, Intel®, and AMD®. The extension unit provides management functions for and supplies power to the basic computing unit and extension components. There may be different options for the power supply and a heat dissipater that are supported by the basic computing unit.

The storage unit includes a hard disk backplane, an SAS expander (Expander), a PCIe switch, and the like. The storage unit is configured for system storage expansion and supports a plurality of media forms such as a hard disk drive (HDD), a solid-state drive (SSD), a non-volatile memory express (NVMe), and a storage class memory (SCM).

The I/O unit includes components such as a riser card, implements system I/O expansion, and supports a standard PCIe card and open compute project (OCP) card.

The acceleration unit includes a riser card, a carrier board, a PCIe switch, and the like, and provides functions of system acceleration component expansion and interconnection.

The memory expansion unit includes a carrier board, a memory expansion chip, a dual in-line memory module (DIMM), an SCM, and the like, and provides functions of expanding a system memory bandwidth and a memory capacity.

The heat dissipation component is configured to dissipate heat for a computing device or hardware in the computing device. The heat dissipation includes a combination of several dissipation manners such as air cooling, liquid cooling, and a combination of the two. It should be understood that a structure of the heat dissipation component, a type of the heat dissipation component, and a quantity of heat dissipation components do not constitute a limitation on the technical solutions that need to be protected in this application.

The computing component includes a central processing unit (CPU), a memory, and the like, and provides universal computing capabilities.

The management component includes a baseboard management controller and provides a function of device management.

It should be noted that the basic computing unit that includes a processor, a memory, and a component of a baseboard management controller, or the extension unit, may also be used as a component.

In addition, in a conventional server architecture, due to evolution of power supplying, a quantity of memory channels, an I/O quantity, a rate, and the like, a socket (Socket) of a processor (for example, a CPU) is generally compatible in a same generation (two upgrades in Tick/Tock). It is difficult to achieve cross-generational compatibility. An external interface may be disposed in a mainboard provided in this application in a standardized manner, and various external extension components may be connected through soft connection, for example, by using a cable. This can avoid differences caused by a processor-related power supply, different processors, and interconnection between components. In this way, a change of a component such as a memory only occurs inside the mainboard, thereby implementing cross-generational compatibility of the mainboard. In this case, vendors do not need to replace a matching complete server, component, or the like when upgrading a processor, thereby prolonging a life cycle of the matching complete server, component, or the like. In addition, customers can replace an old component with the latest one at any time and use the latest computing capabilities in the industry as soon as possible without the need to replace a chassis or increase a hardware development workload. After implementing cross-generational upgrade or cross-series evolution of a server architecture, when upgrading a processor or changing a processor vendor, server vendors only need to replace a basic computing unit, which revolutionizes the original development mode and spawns a new industry mode.

A new server architecture is provided embodiments of this application. To support diversified computing capabilities and diversified devices, the new server architecture further implements standardization of hardware, including standardization of a basic computing unit and standardization of a component interface.

The standardization of a basic computing unit includes standardization of a size, a mounting hole position, an electrical feature of an interface, a management interface protocol, a parameter, and the like. Table 1 is an example of descriptions of interfaces of a basic computing unit according to this application.

TABLE 1

| Interface name | Interface type | Function description |
| --- | --- | --- |
| Power interface | 12 V | 12 V main power input of a basic computing unit |
| High-speed interface | PCIe/flexible input/output (Flexible I/O) | High-speed I/O interface of a CPU to a basic computing unit. The high-speed interface uses a UBC (×8) or UBC-DD (×16) connector. Flexible I/O: Some CPUs support flexible configuration of some high-speed interfaces as a Huawei cache coherency system (HCCS), a serial attached small computer system interface (SAS), a serial advanced technology attachment (SATA), an Ethernet interface, or the like. |
| BCU management interface | (1) High-speed input/output interface includes a high-speed serial port (Hisport); (2) Inter-integrated circuit (IIC or I2C); (3) Universal asynchronous receiver/transmitter (UART); (4) Joint test action group (JTAG); (5) Low pin count bus (Low pin count Bus, LPC); (6) Serial peripheral interface (SPI); (7) Universal serial bus (USB); (8) Direct media interface (DMI)/PCIe; | Low-speed I/O interface to a basic computing unit, configured for management of the basic computing unit and communication between the basic computing unit and an extension unit. The management interface definition is compatible with a plurality of platforms, such as Kunpeng ®, FeiTeng ®, AMD ®, and Intel ®. |

TABLE 1-continued

| Interface name | Interface type | Function description |
|---|---|---|
| | (9) Network controller sideband interface (NCSI); and (10) 3.3 V standby power supply (STBY 3V3) MISC | |

The power supply uses the 12 V input in a unified manner. Various power supplies that are needed are obtained through DC/DC conversion inside the basic computing unit. Considering I/O evolution in the future and CPU differentiation, embodiments of this application defines a flexible I/O interface based on a UBC connector and a UBCDD connector, to replace an original PCIe interface. The flexible I/O interface may be flexibly configured as a PCIe/HCCS/SAS/SATA/ Ethernet interface based on a requirement. The BCU management interface mainly includes a common low-speed maintenance interface, such as an I2C, a UART, and a JTAG. These interfaces are compatible with common processor platforms.

Standardization of an interface for an internal component in a computing system: The component includes an extension unit, a power supply component, a heat dissipation component, a storage unit, an I/O unit, an acceleration unit, and memory expansion unit. An electrical interface, a management interface, and a parameter of the component are standardized without defining or restricting a physical size, installation, and a position of the component. This provides much room for innovation and supports differentiation and scalability. Table 2 describes definitions of low-speed management interfaces of the component other than power supplies and high-speed signal interfaces.

In addition, this application further provides intelligent management software. A management object template is implemented based on a standardization requirement of a computing device. After a server is powered on, the management software automatically detects a component through a standard management bus, obtains self-description information of the component, and then creates a management object instance based on the management object template. In this way, the management software implements adaptive management, that is, intelligent management, and supports automatic discovery and automatic adaptation of the component.

For ease of description, the following embodiments are described by using an example in which the computing device is a server. The solutions provided in this application are also applicable to another computing device such as an edge server and a personal computer (PC).

The server needs to carry a large quantity of services and perform a large amount of data computing. Therefore, a large quantity of components need to be deployed in the server, and a large quantity of processors, a large memory, and more hard disks need to be deployed in the basic computing unit. An operating status of the server depends on working statuses of main components in the server, such as the processors, the memory, and the hard disks that are in the

TABLE 2

| Interface name | Interface type | Function description |
|---|---|---|
| EXU and BCU management interface | HiSPort, I2C, UART, JTAG, LPC, SPI, USB, DMI/PCIe, NCSI, STBY 3V3, and MISC | Connected to a basic computing unit. Low-speed I/O interface to a basic computing unit, configured for management of the basic computing unit and communication between the basic computing unit and extension unit. The management interface definition is compatible with a plurality of platforms, such as x86 and Kunpeng. |
| Management interface for an STU, an IOU, and the like | I2C, JTAG, and STBY 3V3 | Management interface for a storage unit or an I/O unit |
| External BMC interface | GE, VGA, USB, UART, PWR BTN, and UID BTN | External interface for a BMC management unit |

Interfaces other than the EXU and BCU management interfaces are connected to each component through the EXU. It should be noted that embodiments of this application defines only functions of these interfaces, and does not limit a specific pinmap (PINMAP) manner. Any implementation that can implement the functions falls within the protection scope of embodiments of this application.

It should be noted that content in Table 1 and Table 2 is merely an example for assisting in explaining the technical solutions in this application. In a specific implementation, the new server architecture, each interface of the basic computing unit, and each low-speed interface of a functional component may include more or less content.

basic computing unit, and various other components. To ensure that main components in the server can work properly, components such as a temperature sensor (for measuring a temperature of a component), a voltage sensor (for measuring an operating voltage of a component), power supplies of different models (for providing voltages of different volts), and a fan (for cooling a component) are further deployed in the server. An important part of out-of-band management of the server is to monitor and manage an operating environment of the main components in the server. This ensures that the main components in the server may work in a proper operating environment. For example, the temperature is within an operating temperature range of the components, the voltage is within an operating voltage of the components, the power supplies of different models supply power properly, and the fan runs properly.

Because server boards have different structures, there is no unified external interface for out-of-band management. As a result, the baseboard management controller needs to undergo a large amount of adaptation work to implement out-of-band management on any server board, thereby leading to poor flexibility. Therefore, embodiments of this application provide a board management system, method, and apparatus, and a device. In embodiments of this application, a baseboard management controller may be connected to a server board through a unified interface and a management bus. That is, the baseboard management controller and the server board may be connected through only one management bus. The baseboard management controller may obtain, from a memory deployed on the server board through the management bus, management information needed for managing the server board, and may further interact, through the management bus, with a component manager on the server board to manage the server board. The baseboard management controller may obtain working information of a component connected to the component manager on the server board, to implement out-of-band management. In this manner, the baseboard management controller can implement out-of-band management of different server boards without the need to undergo a large amount of adaptation work, thereby simplifying a process of implementing out-of-band management by the baseboard management controller.

FIG. 1 is a schematic diagram of a structure of a board management system according to an embodiment of this application. The board management system may be deployed in a server, and the board management system includes a server board 100 and a baseboard management controller 200.

It should be noted that the server board 100 may be a basic computing unit in the new architecture described above, or any component. The server board 100 may alternatively be a mainboard in a conventional server. A quantity of server boards 100 is not limited in this embodiment of this application, and there may be one or more server boards 100. When the board management system includes a plurality of server boards 100, the plurality of server boards 100 may be of a same type. For example, the plurality of server boards 100 are all basic computing units. The plurality of server boards 100 may alternatively be of different types. For example, the plurality of server boards 100 include one basic computing unit, one I/O unit, and one storage unit.

In this embodiment of this application, the baseboard management controller 200 is connected to the server board 100 through one management bus 300. The management bus 300 may be an I2C (Inter-Integrated Circuit) bus, or may be a serial peripheral interface (SPI) bus. The management bus 300 may alternatively be another type of bus. The management bus 300 may be understood as a root management bus 300 for board management, and the root management bus 300 may be used as a root management link. The baseboard management controller 200 may obtain management information and working information of a component in the server board 100 through the root management link, to manage the server board 100.

Components for a server are deployed on the server board 100. The components deployed on the server board 100 include but are not limited to: a processor, a memory, a temperature sensor, an analog-to-digital converter (ADC), a power interface, a peripheral component interconnect express (pPCIe) slot, a hard disk interface, a fan, a power supply, and the like. For different types of server boards 100, both types and quantities of components deployed on the server boards 100 may be different.

It should be noted that a manner in which a component is deployed on the server board 100 is not limited in this embodiment of this application. For example, the component for the server may be directly welded on the server board 100. For another example, the component for the server may be connected to the server board 100 through an interface (for example, a high-speed interface such as a UBC). In an actual application, some components (such as an I/O unit and a storage unit) may be connected to the basic computing unit through an interface. In this case, these components may also be considered as components deployed on the server board 100.

To implement out-of-band management of the server board 100, a component manager 120 and a memory 110 are further deployed on the server board 100. The baseboard management controller 200 is separately connected to the component manager 120 and the memory 110 through the management bus 300.

The component manager 120 may be connected to some or all components on the server board 100. In this embodiment of this application, the components on the server board 100 include two types. One type is a component connected to the baseboard management controller 200 through the component manager 120. For ease of description, this type of component is referred to as a first-type component. The other type is a component directly connected to the baseboard management controller 200 through the management bus 300. For ease of description, this type of component is referred to as a second-type component. For any server board 100, a component related to out-of-band management (the component related to out-of-band management refers to a component that affects a working environment of a main component on the server board 100) may be a first-type component, that is, all components on the server board 100 are connected to the component manager 120. FIG. 1 is drawn by using an example in which all components on the server board 100 are first-type components. The component related to out-of-band management may also include a first-type component and a second-type component. The second-type component is not connected to the component manager 120, but may be connected to the baseboard management controller 200 through the management bus 300. For a manner of connection between the server board 100 of this type and the baseboard management controller 200, refer to related descriptions in FIG. 2.

The component manager 120 may interact with the first-type component to obtain working information of the first-type component. For example, the component manager 120 may obtain a temperature value from a temperature sensor, a voltage value from a voltage sensor, whether a power supply is connected to a power interface, a voltage provided by the power supply (the power supply voltage is obtained by connecting to an ADC, and the ADC converts an analog signal of the voltage into a data signal), whether a PCIe interface component (such as an acceleration card) is inserted into a PCIe slot, whether a hard disk interface is connected to a hard disk, whether a fan is running, and the like.

The memory 110 stores management information of the server board 100, where the management information is information required by the baseboard management controller 200 to implement out-of-band management. Related descriptions of the management information of the server board 100 are as follows.

The baseboard management controller 200 is connected to the component manager 120 and the memory 110 through the management bus 300. The baseboard management controller 200 may obtain the management information of the server board 100 from the memory 110, to learn of a property of the server board, a property of a component, topological information of the server board 100, and the like. The baseboard management controller 200 may further obtain the working information of the first-type component by interacting with the component manager 120. The baseboard management controller 200 manages the server board 100 based on the management information (and the working information of the first-type component).

Figure 2:
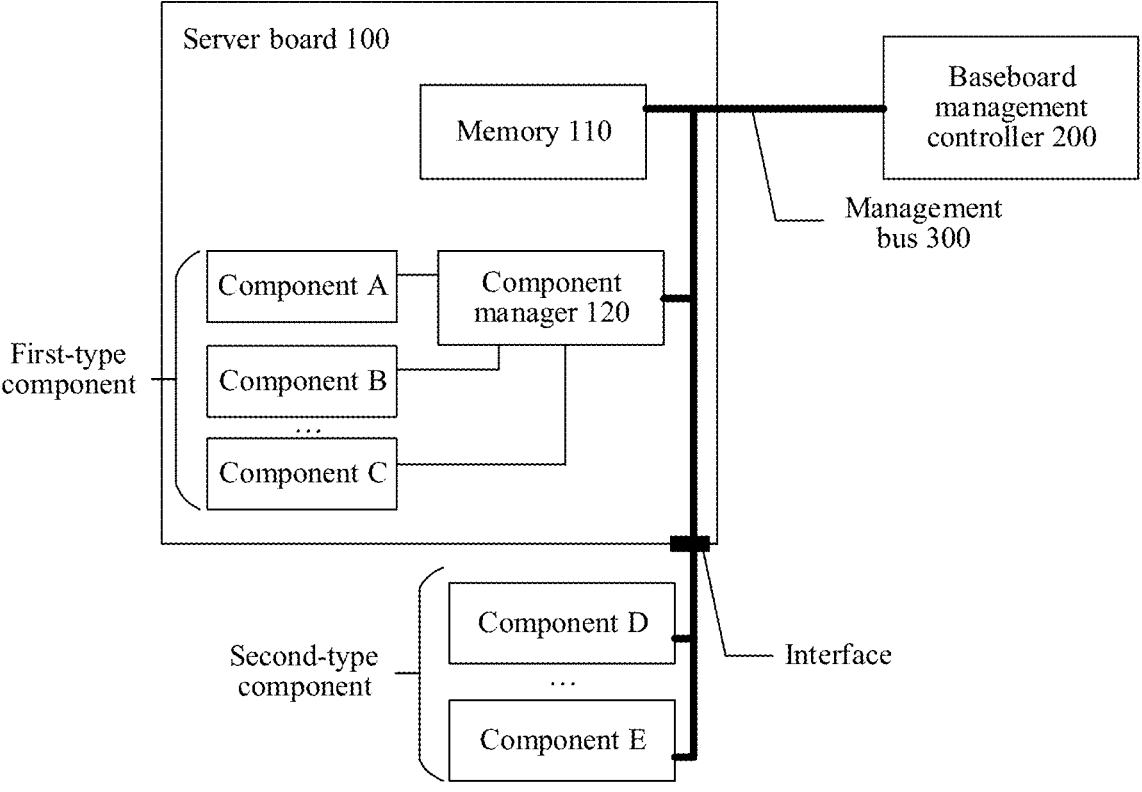
FIG. 2 is a schematic diagram of an architecture of another board management system according to this application.

FIG. 2 is a schematic diagram of a structure of another board management system according to an embodiment of this application. The board management system may be deployed in a server, and the board management system includes a server board 100 and a baseboard management controller 200. The baseboard management controller 200 and the server board 100 are connected through only one management bus 300, and the baseboard management controller 200 is connected to a component manager 120, a memory 110, and a second-type component through one management bus 300. The component manager 120 is connected to a first-type component on the server board 100. For descriptions of the baseboard management controller 200, the component manager 120, the memory 110, the management bus 300, the first-type component, and the second-type component, refer to the foregoing content. Different from the board management system shown in FIG. 1, in the board management system shown in FIG. 2, a component on the server board 100 may alternatively be directly connected to the baseboard management controller 200 through the management bus 300, and is directly managed by the baseboard management controller 200.

In this board management system, likewise, the baseboard management controller 200 and the server board 100 are connected through only one management bus 300. The manner of connection between the baseboard management controller 200 and the server board 100 is simple, and the baseboard management controller 200 is also applicable to different server boards 100.

The following describes various components of the board management system.

(1) Memory 110

In this embodiment of this application, the memory 110 is configured to store management information of the server board 100 required for out-of-band management. A type of the memory 110 is not limited in this embodiment of this application. The memory 110 may be an electrically erasable programmable read-only memory (EEPROM), or may be another non-volatile memory. The memory 110 stores a field replaceable unit description (fFRUD), and the FRUD stores the management information required for managing the server board 100. The management information includes property information of the server board 100, information about a component that needs to be managed, topological information, alarm information, and the like.

The management information includes property information of the server board 100, topological information of the server board 100, and property information of a component.

The property information of the server board 100 is used to describe hardware information of the server board 100. The property information of the server board includes but is not limited to: a board type, a board identifier (ID), a printed circuit board (PCB) version number of the board, and a bill of material (BOM) version number of the board.

After obtaining the property information of the server board 100, the baseboard management controller 200 can learn of the basic information of the server board 100.

The topological information of the server board 100 describes a connection relationship between components on the server board 100. The topological information of the server board 100 may include an in-band management topology and a management bus topology.

The in-band management topology may also be referred to as a service bus topology. The in-band management topology describes topological information of a service plane of the server board 100, that is, a connection relationship between components (a processor, a hard disk, and a memory) that are in the server board 100 and bear a server service, including but not limited to: a connection relationship between components on a basic computing unit, a connection relationship between the basic computing unit and a component, and a connection relationship between components. The in-band management topology includes but is not limited to: a signal of a component, information about a processor (such as a port number, a type, a quantity, and a bit width), information about a memory (such as a port number, a type, a quantity, and a bit width), information about a hard disk (such as a hard disk interface, a type, a quantity, and a bit width), a manner of connection between the processor, the memory, and the hard disk, and the like. Information about all components that involve the service plane may be recorded in the in-band management topology.

The management bus topology may also be referred to as an out-of-band management topology, and the management bus topology describes topological information of components that are on the server board 100 and involve out-of-band management, that is, a connection relationship between components (a temperature sensor, a voltage sensor, an ADC, a power supply, and a fan) that are in the server board 100 and involve out-of-band management. The management bus topology includes but is not limited to: information about a component (for example, the component manager 120 or the second-type component) connected to the management bus 300, and information about a component (that is, the first-type component) connected to the component manager 120. Information about all components that involve out-of-band management may be recorded in the in-band management topology.

The baseboard management controller 200 obtains the topological information of the server board 100, to learn of the connection relationship between the components on the server board 100. Based on the topological information of the server board 100, the baseboard management controller 200 may determine a component that corresponds to a working environment described in the working information (for example, information such as a temperature, a voltage, and whether a power supply works) of the first-type component that is subsequently read by the component manager 120, and determine a component that corresponds to a working environment described in working information of the second-type component that is directly read from the second-type component, so as to determine whether the working environment of the component meets a requirement or whether the component is faulty, and if the component is faulty, indicate whether an alarm needs to be issued.

The property information of a component includes property information of the first-type component and property information of the second-type component. In terms of a type of the component, the component includes a chip (such as a processor chip), a connector, a bus, and a slot (the slot refers to a slot into which an input/output device is inserted, such as a PCIe slot and a hard disk slot).

For information included in the management information, refer to Table 3. It should be noted that only a part of 5 information in the management information is shown in the foregoing descriptions and Table 1. A division manner and content of the information in the management information are not limited in this embodiment of this application. All information required for out-of-band management may be used as the management information and stored in the memory 110.

TABLE 3

| Information name | Sub-information included in information | Definition | Property name | Description |
|---|---|---|---|---|
| Board property information (board properties) | None | Hardware information of a board | Type (Type) | Type of the board |
| | | | Identifier (ID) | ID of the board |
| | | | PCB version (PCB Version) | PCB version number of the board |
| | | | BOM version (BOM Version) | BOM version number of the board |
| Topological information (physical topology) | Management bus topology (management topology) | Management bus topology | Node name (name) | Information (such as a name and a type) about a component (such as a connector and a chip) connected to the management bus |
| | | | Child node of a node (children) | A component that is connected to the component connected to the management bus |
| | Service bus topology (Buisness Topology) | Service bus topology | Node name (name) | Processor information (such as a name, a type, and a processor slot (slot)), memory, information, slot information (such as a PCIe slot), interface information (such as a PCIe port), and the like |
| | | | Port channel (start lane) index of a node | Port index or channel index of a component. If the component is a CPU slot (slot), the port index of the component is a root port (root port) index. |
| | | | Bit width (Width) | Bit width |
| | | | Child node of a node (Children) | Component connected to another component |
| Component property information, also referred to as physical object property information | Bus (buses) | Property information of the bus | Name (name) | Name of the bus |
| | | | Type (Type) | Type of the bus |
| | | | Bus identifier (Bus ID) | Index of the bus |

TABLE 3-continued

| Information name | Sub-information included in information | Definition | Property name | Description |
|---|---|---|---|---|
| (physical object properties) | | | Bus owner (Owner) | Owner of the bus, that is, a start port and an end port of the bus |
| | Chip (Chips) | Property information of the chip | Name (name) | Name of the chip, used to distinguish between different chips |
| | | | Chip model (Chip Model) | Model of the chip |
| | | | Chip address (Address) | Unique address of the chip |
| | | | Register (Registers) | a register in the chip |
| | Connector (Connector) | Property information of the connector | Name (name) | Name of the connector |
| | | | Index (Index) | Index of the connector for a management bus 300, used to identify different connectors |
| | | | Type (Type) | Type of the connector |
| | | | Presence (Presence) | Present association component Note: After a cable is plugged into the connector, the connector sends a present signal to a component connected to the connector (to indicate that a cable is plugged). A present association chip is a component that can provide the present signal. The chip may be a component manager 120, or may be a second-type component. |

In this embodiment of this application, the management information required for out-of-band management is stored in the memory 110, and an address of the memory 110 may be a preset address. When the baseboard management controller 200 is connected to the memory 110 through the management bus 300, the baseboard management controller 200 may interact with the memory 110 by using the address, and read the management information from the memory 110, to implement subsequent out-of-band management. The baseboard management controller 200 can obtain the management information in a simple and quick manner. This simplifies an out-of-band management process.

In this embodiment of this application, a root management bus is used as a unified out-of-band management interface of the server board 100. The memory 110 (for example, an EEPROM) with a fixed address may be connected to the root management link as the FRUD. The management information of the server board 100 is described in the FRUD. The baseboard management controller 200 may automatically load a management configuration of the board by reading information in the FRUD.

(2) Component Manager 120

The component manager 120 may also be referred to as a satellite management center (SMC). After collecting the working information of the first-type component on the board, the SMC reports the working information to the baseboard management controller 200 through a root management bus interface. The working information may be reported by using a command word. One type of working information may correspond to one command word.

On the server board 100, the SMC is used as a board-level management center to collect the working information of the first-type component on the board, for example, information about a sensor and alarm information, and process a requirement for upgrading the server board 100 and a requirement for managing another component on the board. The SMC communicates with the baseboard management controller 200 through the root management bus interface by using the command word.

In this embodiment of this application, the baseboard management controller 200 does not need to be connected to components on which out-of-band management needs to be performed. Instead, the baseboard management controller 200 obtains working information of these components through the component manager 120, to determine a working environment of a main component in the server. The baseboard management controller 200 only needs to be connected to the component manager 120. This can greatly simplify a manner of connection between the baseboard management controller 200 and the server board 100, and implement intelligent out-of-band management of the server board 100. This manner of connection is also applicable to different server boards 100.

A specific structure of the component manager 120 is not limited in this embodiment of this application. For example, the component manager 120 may be a complex programmable logic device (CPLD), or may be a microcontroller unit (MCU). After collecting the working information of the components connected to the component manager 120, the component manager 120 may report the collected information to the baseboard management controller 200 through the management bus 300.

A manner of interaction between the component manager 120 and the baseboard management controller 200 is not limited in this embodiment of this application. For example, the component manager 120 may interact with the baseboard management controller 200 by using a command word. One type of working information corresponds to one command word. A format of the command word may be shared by different server boards 100. In this way, the baseboard management controller 200 may interact with the component manager 120 on the different server boards 100 in a same manner, thereby reducing unnecessary adaptation work.

The following describes a manner of designing a command word. Refer to FIG. 3. The format of the command word defined for interaction between the component manager 120 and the baseboard management controller 200 mainly includes two parts: an operation code (OP code) and a component parameter (parameter). A specific size of the command word is not limited in this embodiment of this application. In a possible implementation, a commander may occupy four bytes (that is, 32 bits). The component parameter may occupy one byte, and the operation code may occupy three bytes.

The operation code describes an operation that needs to be performed on a component. In this embodiment of this application, the operation may include reading working information of the component and delivering a command to the component (the delivering a command to the component may be understood as writing information to the component). The component parameter indicates a component on which an operation needs to be performed. The component parameter may be a number or an identifier of the component.

The operation code includes four fields, namely, a function (function) field, a command (command) field, a read count field (the field is represented by MS in FIG. 3), and a read/write identifier field (the field is represented by RW in FIG. 3).

The function field indicates the server board 100 to which the command word is directed. If the board management system includes a plurality of boards, the function field cannot be defaulted. If the board management system includes only one board, the content of the function field may be set to a default value or a null value. The function field may occupy six bits.

When different types of server boards 100 exist, different numbers may be used to indicate the different types of server boards 100. As shown in FIG. 3, 1 may indicate an extension component (the extension component is a component configured to add an interface or a slot in a server). 2 indicates a storage unit (the storage unit is a component that is in a server and used to connect a hard disk and implement a data storage function). 3 indicates a basic computing unit. 4 indicates a memory expansion unit (the memory expansion unit is a component that is in the server and bears a memory function). 0 represents a universal command, that is, the command word is for all server boards 100.

The command field is used to describe an operation type, for example, indicate which type of working information (for example, a temperature, a voltage, whether a power supply is normal, a fault, or an alarm) is to be read. The command field needs to be predefined to distinguish between different operations. The command field may occupy 16 bits.

The read count field is used to distinguish whether this operation is a plurality of times of reading or a single time of reading, that is, indicate to read working information of a plurality of components at a time or read working information of one component at a time. For example, a value 0 in the field indicates a plurality of times of reading, and a value 1 in the field indicates a single time of reading. The read count field may occupy 1 bit.

The read/write identifier field is used to distinguish between a read operation and a write operation. For example, a value 0 in the field indicates a read operation, and a value 1 in the field indicates a write operation. The read/write identifier field may occupy 1 bit.

When the baseboard management controller 200 needs to read a working parameter of a component, a process of interaction between the component manager 120 and the baseboard management controller 200 includes: The baseboard management controller 200 initiates a read request to the component manager 120, and the component manager 120 feeds back a read response to the baseboard management controller 200.

FIG. 4A is a schematic diagram of a format of a read request according to an embodiment of this application. FIG. 4B is a schematic diagram of a format of a read response according to an embodiment of this application. In FIG. 4A and FIG. 4B, the first row is a name of each field, and the second row is a quantity of bits occupied by each field.

When the baseboard management controller 200 needs to write information to a component, in other words, the baseboard management controller 200 delivers a command to the component (for example, to control the component to be started, stopped, or upgraded), the process of interaction between the component manager 120 and the baseboard management controller 200 includes: The baseboard management controller 200 initiates a write request to the component manager 120, where the write request carries a command (for example, the control command) or data (an upgrade file) that needs to be written.

FIG. 4C is a schematic diagram of a format of a write request according to an embodiment of this application. In FIG. 4C, the first row is a name of each field, and the second row is a quantity of bits occupied by each field.

For definitions of the fields in FIG. 4A to FIG. 4C, refer to Table 4.

TABLE 4

| S | This field carries a start signal sent by a baseboard management controller 200. |
|---|---|
| SR | This field carries a repeated start signal sent by a baseboard management controller 200. |
| P | This field carries a stop signal sent by a baseboard management controller 200. |
| A | This field indicates an ACK, to be specific, compliance with an ACK sending manner specified in the standard I2C protocol. |
| RD | This field is used to identify whether to read data or write data. For example, 1 may be used herein to indicate reading data. |
| WR | This field is used to identify whether to read data or write data. For example, 0 may be used herein to indicate writing data. |
| Component address (Device Address) | Address of a component manager 120 |
| Command code (Command Code) | Read/write command code 0x20 indicates a read request; 0x21 indicates a read response; and 0x22 indicates a write request. |
| OpCode-1 | First byte of an operation code |
| OpCode-2 | Second byte of an operation code |
| OpCode-3 | Third byte of an operation code |
| Parameter (Parameter) | Component parameter |
| Length (Length) | Data length, which indicates a quantity of bytes between Length and CRC8, with a value ranging from 1 to 255. |
| Cyclic redundancy check (CRC) | Cyclic redundancy check (CRC) of all data from a start signal to a stop signal |
| Completion code (Completion Code) | Completion code returned by a component manager 120 (the completion code may indicate a data fault, data not ready, and a data status) |
| Data (data)-1 | This field may be the first byte of working information that is of a component and that is fed back in a read response, or the first byte of a command or data carried in a write request. |
| Data (data)-N | This field may be an $N^{th}$ byte of working information that is of a component and that is fed back in a read response, or the $N^{th}$ byte of a command or data carried in a write request. In FIG. 4B, the working information that is of a component and that is fed back in a read response is split into N bytes, and the N bytes are respectively carried in corresponding fields. In FIG. 4C, the delivered command or data is split into N bytes, and the N bytes are respectively carried in corresponding fields. |

It should be noted that the fields in FIG. 4A to FIG. 4C are merely examples. In an actual application, when fields in the read request, the write request, and the read response are designed, a new field may be added or an existing field may be deleted based on an actual requirement.

In this embodiment of this application, not only the component manager 120 exchanges the working information of the first-type component with the baseboard management controller 200, but also the baseboard management controller 200 may further deliver a control command to the first-type component by interacting with the component manager 120, to control a status of the first-type component. For example, the control command may be a command for controlling a specific first-type component or several specific first-type components to stop working or start working. The control command may be carried, as data, in a data field shown in FIG. 4C. After receiving the write request, the component manager 120 may identify a control command in the write request, and control a corresponding first-type component according to the control command, for example, control the first-type component to stop working or start working.

The baseboard management controller 200 may further deliver an upgrade command to the first-type component by interacting with the component manager 120, to indicate the first-type component to perform upgrading. An upgrade file required for upgrading the first-type component may be carried, as data, in a data field shown in FIG. 4C. After receiving the write request, the component manager 120 may identify the upgrade file in the write request, and send the upgrade file to the corresponding first-type component, to indicate the first-type component to perform upgrading.

The baseboard management controller 200 may alternatively directly indicate the component manager 120 to perform upgrading, and the upgrade file required for upgrading the component manager 120 may be carried, as data, in a data field shown in FIG. 4C. After receiving the write request, the component manager 120 may identify the upgrade file in the write request, and perform upgrading by using the upgrade file.

(3) Baseboard Management Controller 200

It can be learned from the foregoing descriptions about the memory 110 and the component manager 120 that the baseboard management controller may read management information from the memory 110 through the management bus 300, and may further implement out-of-band management on the first-type component by interacting with the component manager 120.

If a component (that is, the second-type component) on the server board 100 cannot be managed by the SMC, the component may be directly connected to the baseboard management controller 200 to directly output a root management bus, and the baseboard management controller 200 automatically loads a management feature of the component by describing in the FRUD.

In this embodiment of this application, the second-type component is allowed to exist on the server board 100. The second-type component may be directly connected to the baseboard management controller 200 through the management bus 300. The baseboard management controller 200 may directly interact with the second-type component through the management bus 300, to obtain the working information of the second-type component, and implement out-of-band management of the second-type component.

The baseboard management controller 200 may determine, based on the management information, the second-type component deployed on the server board 100, that is, learn of information about the second-type component directly connected to the management bus 300. The baseboard management controller 200 may pre-load a management driver (the management driver refers to a software program required for managing the second-type component) of the second-type component based on the management information, to manage the second-type component.

Figure 5A:
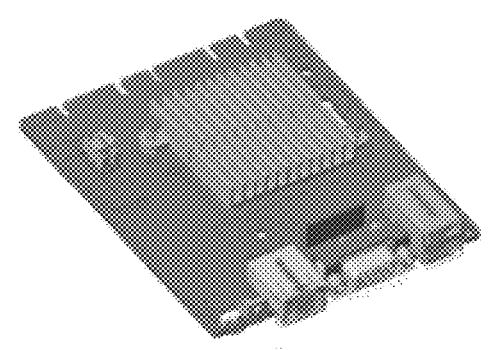
FIG. 5A and FIG. 5B are schematic diagrams of a structure of an extension unit according to this application.
Figure 5B:
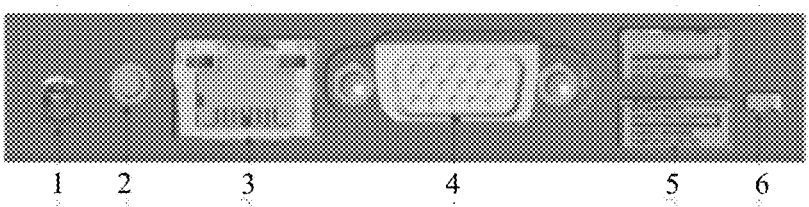

In this embodiment of this application, the baseboard management controller 200 may be deployed on a board to form a BMC management board (that is, an extension unit mentioned above). The BMC management board may be used as a management center of a server, and is configured to implement out-of-band management of the server. An appearance of the BMC management board may be shown in FIG. 5A. The BMC management board provides external management interfaces, including a debugging serial port, a unit identification (UID) indicator, a management network port, a video graphics array (VGA) interface, and a universal serial bus (USB) interface. The external management interfaces provided by the BMC management board are shown in FIG. 5B.

Table 5 describes the external management interfaces provided by the BMC management board.

TABLE 5

| Number | Interface | Interface description |
|---|---|---|
| 1 | Debugging serial port | 3.5 mm audio port, which is a system serial port by default. The port can be configured as a BMC serial port by using a command line. This port is mainly configured for debugging. |
| 2 | UID button | UID button. The UID button/indicator is used to locate a device on which an operation is to be performed. |
| 3 | Management network port | RJ45, and an outbound Ethernet port providing a rate of 1000 Mbps. The port supports 10/100/1000 Mbps (M) auto-sensing. The server may be managed through this port. |
| 4 | VGA port | DB15, configured to connect a display terminal, such as a display or a physical KVM. |
| 5 | USB 3.0 port | This port provides an outbound USB port, and a USB device may be connected through this port. |
| 6 | UID indicator | UID indicator. The UID button/indicator is used to locate a device on which an operation is to be performed. |

The BMC management board provides an internal management interface required for board management through a 4C+ connector, including an interface for an out-of-band management bus. If the management bus is an I2C bus, the interface for the out-of-band management bus is an I2C interface.

The BMC management board may further provide another management interface. A type of the another management interface is not limited in this embodiment of this application. The another management interface includes a part or all of the following: a joint test action group (JTAG) interface, an SPI interface, a network controller sideband interface (NCSI), a platform environment control interface (PECI) debugging serial port, a UID button indicator, a management network port, and a VGA port. The type of the another management interface is merely an example, and a quantity and the type of the another management interface are not limited in this embodiment of this application.

The BMC management board further provides a low pin count architecture (LPC) interface, a USB port, and a PECI interface that are required for in-band management. The BMC management board is further deployed with a power supply, a clock circuit, a spurious signal circuit, and the like needed for the baseboard management controller to work. Table 6 describes pins of the internal management interface provided by the BMC management board.

TABLE 6

| Type (Host for BMC) | Level | Signal definition | Pin | Pin | Signal definition | Level | Type (Host for BMC) |
|---|---|---|---|---|---|---|---|
| Power/GND | / | GND | OB1 | OA1 | GND | / | Power/GND |
| input | USB3 | USB3__CPU__CON1__N | OB2 | OA2 | USB3__CON1__CPU__N | USB3 | output |
| input | USB3 | USB3__CPU__CON1__P | OB3 | OA3 | USB3__CON1__CPU__P | USB3 | output |
| Power/GND | / | GND | OB4 | OA4 | GND | / | Power/GND |

TABLE 6-continued

| Type (Host for BMC) | Level | Signal definition | Pin | Pin | Signal definition | Level | Type (Host for BMC) |
|---|---|---|---|---|---|---|---|
| input | USB3 | USB3_CPU_CON2_P | OB5 | OA5 | USB3_CON2_CPU_P | USB3 | output |
| input | USB3 | USB3_CPU_CON2_N | OB6 | OA6 | USB3_CON2_CPU_N | USB3 | output |
| Power/GND | / | GND | OB7 | OA7 | GND | / | Power/GND |
| inout | USB2 | USB2_CPU_CON1_N | OB8 | OA8 | USB2_CPU_CON2_N | USB2 | inout |
| inout | USB2 | USB2_CPU_CON1_P | OB9 | OA9 | USB2_CPU_CON2_P | USB2 | inout |
| Power/GND | / | GND | OB10 | OA10 | GND | / | Power/GND |
| Power/GND | 5.0 V (V) | V_VCC_5V0_USB0 | OB11 | OA11 | GND | / | Power/GND |
| Power/GND | 5.0 V | V_VCC_5V0_USB0 | OB12 | OA12 | GND | / | Power/GND |
| Power/GND | 5.0 V | V_VCC_5V0_USB1 | OB13 | OA13 | PECI_VREF_CPU_BMC | 1.0 V | Power/GND |
| Power/GND | 5.0 V | V_VCC_5V0_USB1 | OB14 | OA14 | PECI_CPU_BMC | 1.0 V | inout |
| — | — | KEY | — | — | — | — | — |
| Power/GND | 3.3 V | V_STBY_3V3 | B1 | A1 | GND | / | Power/GND |
| Power/GND | 3.3 V | V_STBY_3V3 | B2 | A2 | GND | / | Power/GND |
| Power/GND | 3.3 V | V_STBY_3V3 | B3 | A3 | LB_ADDR9 | 3.3 V | inout |
| Power/GND | / | GND | B4 | A4 | LB_ADDR8 | 3.3 V | inout |
| input | 3.3 V | INT1_RSV | B5 | A5 | LB_ADDR7 | 3.3 V | inout |
| output | 3.3 V | LB_WEN | B6 | A6 | LB_ADDR6 | 3.3 V | inout |
| output | 3.3 V | LB_CS0N | B7 | A7 | GND | / | Power/GND |
| output | 3.3 V | LB_CS1N | B8 | A8 | LB_ADDR5 | 3.3 V | inout |
| output | 3.3 V | GND | B9 | A9 | LB_ADDR4 | 3.3 V | inout |
| inout | 3.3 V | LB_OEN | B10 | A10 | LB_ADDR3 | 3.3 V | inout |
| inout | 3.3 V | LB_ALE | B11 | A11 | LB_ADDR2 | 3.3 V | inout |
| Power/GND | / | GND | B12 | A12 | GND | / | Power/GND |
| input | 3.3 V | NCSI_REF_CLK_50M | B13 | A13 | LB_ADDR1 | 3.3 V | inout |
| input | 3.3 V | NCSI_RX_D0 | B14 | A14 | LB_ADDR0 | 3.3 V | inout |
| input | 3.3 V | NCSI_RX_D1 | B15 | A15 | GND | / | Power/GND |
| input | 3.3 V | NCSI_RX_DV | B16 | A16 | SPI1_BMC_CLK | 3.3 V | input |
| output | 3.3 V | NCSI_TX_D0 | B17 | A17 | SPI1_BMC_CS0_N | 3.3 V | input |
| output | 3.3 V | NCSI_TX_D1 | B18 | A18 | SPI1_BMC_MISO | 3.3 V | output |
| output | 3.3 V | NCSI_TX_EN | B19 | A19 | SPI1_BMC_MOSI | 3.3 V | input |
| Power/GND | / | GND | B20 | A20 | GND | / | Power/GND |
| inout | / | USB2_BMC_DEVICE_D0_N | B21 | A21 | USB2_BMC_DEVICE_D1_N | / | inout |
| inout | / | USB2_BMC_DEVICE_D0_P | B22 | A22 | USB2_BMC_DEVICE_D1_P | / | inout |
| Power/GND | / | GND | B23 | A23 | GND | / | Power/GND |
| inout | / | USB2_BMC_HOST_D0_N | B24 | A24 | USB2_BMC_HOST_D1_N | / | inout |
| inout | / | USB2_BMC_HOST_D0_P | B25 | A25 | USB2_BMC_HOST_D1_P | / | inout |
| Power/GND | / | GND | B26 | A26 | GND | / | Power/GND |
| output | 3.3 V | I2C_0_SCL | B27 | A27 | I2C_1_SCL | 3.3 V | output |
| inout | 3.3 V | I2C_0_SDA | B28 | A28 | I2C_1_SDA | 3.3 V | inout |
| — | — | KEY | — | — | — | — | — |
| Power/GND | / | GND | B29 | A29 | GND | / | Power/GND |
| input | PCIe | PCIE_CPU_BMC_L0_N | B30 | A30 | PCIE_BMC_CPU_L0_N | PCIe | output |
| input | PCIe | PCIE_CPU_BMC_L0_P | B31 | A31 | PCIE_BMC_CPU_L0_P | PCIe | output |
| Power/GND | / | GND | B32 | A32 | GND | / | Power/GND |
| input | PCIe | PCIE_CPU_BMC_L1_N | B33 | A33 | PCIE_BMC_CPU_L1_N | PCIe | output |
| input | PCIe | PCIE_CPU_BMC_L1_P | B34 | A34 | PCIE_BMC_CPU_L1_P | PCIe | output |
| Power/GND | / | GND | B35 | A35 | GND | / | Power/GND |
| input | HCSL | CLK_100M_PE_0_N | B36 | A36 | CLK_100M_PE_1_N | HCSL | input |
| input | HCSL | CLK_100M_PE_0_P | B37 | A37 | CLK_100M_PE_1_P | HCSL | input |
| Power/GND | / | GND | B38 | A38 | GND | / | Power/GND |
| output | 3.3 V | I2C_2_SCL | B39 | A39 | I2C_3_SCL | 3.3 V | output |
| inout | 3.3 V | I2C_2_SDA | B40 | A40 | I2C_3_SDA | 3.3 V | inout |
| output | 3.3 V | UART_HOST_TX | B41 | A41 | UART_SOL_TX | 3.3 V | output |
| input | 3.3 V | UART_HOST_RX | B42 | A42 | UART_SOL_RX | 3.3 V | input |
| — | — | KEY | — | — | — | — | — |
| inout | 1.8 V | LPC_SIRQ | B43 | A43 | GPIO_UIDLED | 3.3 V | input |
| input | 1.8 V | LPC_CLK | B44 | A44 | GPIO_RSTSYS_N | 3.3 V | output |
| input | 1.8 V | LPC_FRAME_N | B45 | A45 | GPIO_RSTBMC_N | 3.3 V | input |
| inout | 1.8 V | LPC_AD0 | B46 | A46 | GPIO_RSVD_1(Strap) | 3.3 V | inout |
| inout | 1.8 V | LPC_AD1 | B47 | A47 | GPIO_PSU_LOST_INT | 3.3 V | input |
| inout | 1.8 V | LPC_AD2 | B48 | A48 | GPIO_VGA_SEL | 3.3 V | input |
| inout | 1.8 V | LPC_AD3 | B49 | A49 | GPIO_UPDATE_BIOS_EN | 3.3 V | output |
| input | 1.8 V | RST_LPC_N | B50 | A50 | GPIO_UIDBTN | 3.3 V | output |
| Power/GND | / | GND | B51 | A51 | GND | / | Power/GND |
| output | 3.3 V | I2C_4_SCL | B52 | A52 | I2C_6_SCL | 3.3 V | output |
| inout | 3.3 V | I2C_4_SDA | B53 | A53 | I2C_6_SDA | 3.3 V | inout |
| inout | 3.3 V | I2C_5_SDA | B54 | A54 | I2C_7_SDA | 3.3 V | inout |
| output | 3.3 V | I2C_5_SCL | B55 | A55 | I2C_7_SCL | 3.3 V | output |
| Power/GND | 3.3 V | GND | B56 | A56 | GND | / | Power/GND |
| output | 3.3 V | JTAG_BMC_TCK | B57 | A57 | SPI0_BMC_CLK | 3.3 V | output |
| output | 3.3 V | JTAG_BMC_TDI | B58 | A58 | SPI0_BMC_CS0_N | 3.3 V | output |
| input | 3.3 V | JTAG_BMC_TDO | B59 | A59 | SPI0_BMC_MISO | 3.3 V | input |
| output | 3.3 V | JTAG_BMC_TMS | B60 | A60 | SPI0_BMC_MOSI | 3.3 V | output |
| input | 3.3 V | MODE_0(Strap) | B61 | A61 | GND | / | Power/GND |
| input | 3.3 V | MODE_1(Strap) | B62 | A62 | I2C_8_SCL | 3.3 V | output |
| input | 3.3 V | MODE_2(Strap) | B63 | A63 | I2C_8_SDA | 3.3 V | inout |

TABLE 6-continued

| Type (Host for BMC) | Level | Signal definition | Pin | Pin | Signal definition | Level | Type (Host for BMC) |
|---|---|---|---|---|---|---|---|
| input | 3.3 V | PCIE_CPU_BMC_PERST_0_N | B64 | A64 | I2C_9_SDA | 3.3 V | inout |
| input | 3.3 V | PCIE_CPU_BMC_PERST_1_N | B65 | A65 | I2C_9_SCL | 3.3 V | output |
| Power/GND | / | GND | B66 | A66 | GND | / | Power/GND |
| output | VGA | BMC_VGA_BLUE | B67 | A67 | BMC_VGA_HS | 3.3 V | output |
| output | VGA | BMC_VGA_GREEN | B68 | A68 | BMC_VGA_VS | 3.3 V | output |
| output | VGA | BMC_VGA_RED | B69 | A69 | GND | / | Power/GND |
| Power/GND | / | GND | B70 | A70 | V_STBY_5V0 | 5.0 V | Power/GND |

Power/GND indicates a power signal or a ground signal. USB3 indicates that a USB 3.0 port is supported. Input indicates a signal input. Output indicates a signal output. VGA refers to a VGA signal. In the table above, the VGA signal includes three signals: a red signal, a green signal, and a blue signal. HCSL refers to a high-speed current steering logic level (high-speed current steering logic). The signal definitions are merely example content. In actual use, different signal definitions may alternatively be set based on an actual requirement. The following describes the board management system according to this embodiment of this application by using structures of board management systems to which three different types of server boards 100 belong as examples.

First type: A server board 100 is a basic computing unit (BCU).

Figure 6A:
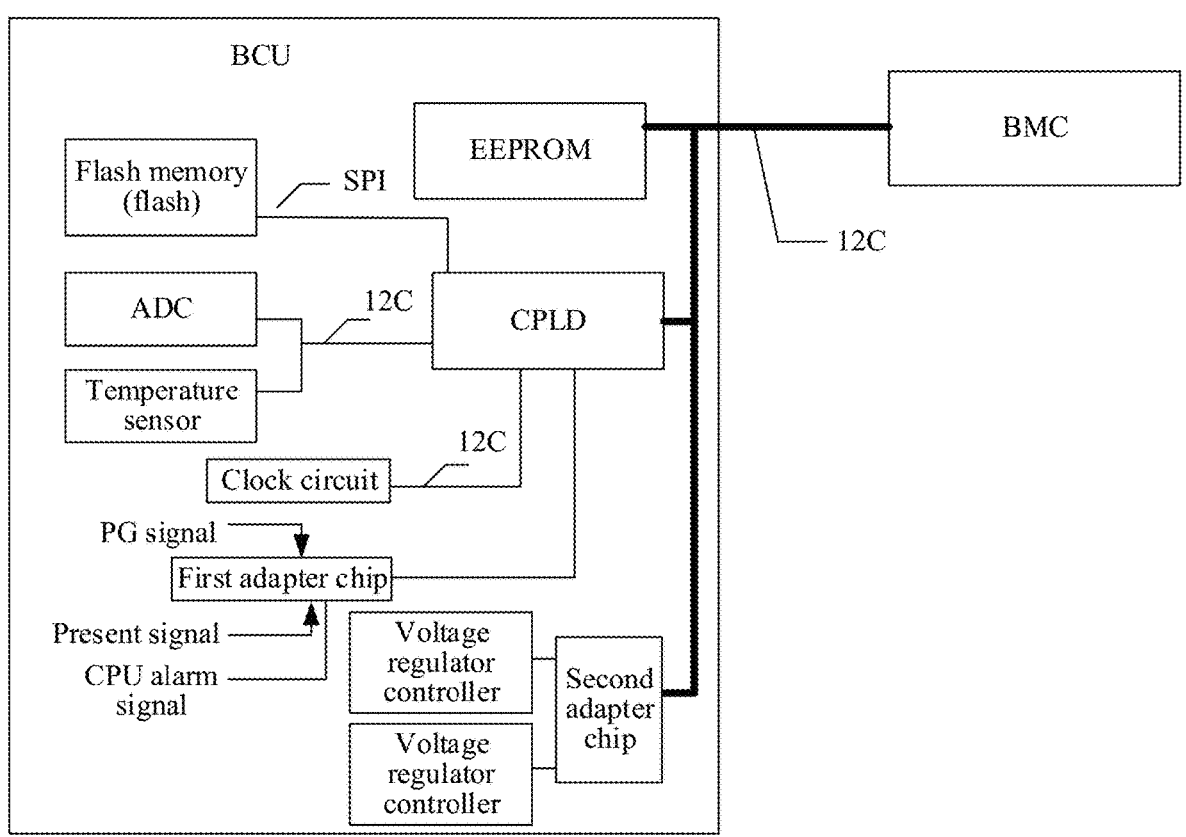
FIG. 6A to FIG. 6C are schematic diagrams of architectures of a board management system according to this application.

FIG. 6A shows a board management system according to an embodiment of this application. The board management system can be configured to implement out-of-band management of a computing processing unit. A BMC connects to an EEPROM and a CPLD of the BCU through one I2C bus. The EEPROM is configured to implement a function of the memory 110 in the foregoing embodiment, and stores management information of the computing processing unit, for example, property information of the computing processing unit. The CPLD is configured to implement a function of the SMC in the foregoing embodiment, for example, implement management and control of a component, and process an upgrade command or a control command. The CPLD is connected to components such as an ADC, a temperature sensor, a clock circuit, and a flash memory. In FIG. 6A, the CPLD may obtain some signals from some components on the server board 100 through a first adapter chip. In FIG. 6A, the CPLD may obtain three types of signals from the server board 100 through the first adapter chip. The three types of signals are a power good (PG) signal (the power good signal indicates whether a power supply is connected or not), a present (present) signal (for example, the present signal may indicate whether a component is connected to a connector), and a fault (fault) signal.

The power good signal indicates whether the power supply is connected or not. The present (present) signal may indicate whether a component is connected to the connector. The fault signal may indicate whether a component is faulty. For example, the component may be a CPU or a power controller. For example, the CPU may be directly connected to the first adapter chip (for example, a 9555 chip) through a low-speed signal cable, to provide a CPU alarm signal, where the CPU alarm signal indicates that an error occurs in the CPU. The first adapter chip is configured to increase a quantity of components to be connected.

The CPLD may obtain working information of the ADC (the working information of the ADC is a digital signal converted by the ADC from a voltage signal), a temperature, the CPU alarm signal, and working information of the power supply such as power supplying information. The CPLD may further implement functions of loading a clock circuit frequency and upgrading the flash memory.

A second adapter chip (for example, a 9545 chip) may provide a plurality of I2C interfaces. After being expanded by the second adapter chip, a plurality of voltage regulator controllers (voltage regulator controllers) on the computing processing unit are directly connected to the I2C bus. Topological information in the computing processing unit in the EEPROM describes a connection relationship in which the voltage regulator controllers are directly connected to the I2C bus. The voltage regulator controllers are configured to supply power to the CPU.

The BMC may directly manage the voltage regulator controllers. By using a command word and by interacting with the BMC through the I2C bus, the CPLD transfers working information of a component connected to the CPLD. The CPLD may further be controlled by the BMC to perform operations, such as upgrading and loading, on some components. The BMC may further upgrade the CPLD through the I2C bus.

Second type: A server board 100 is an I/O unit (IOU).

Figure 6B:
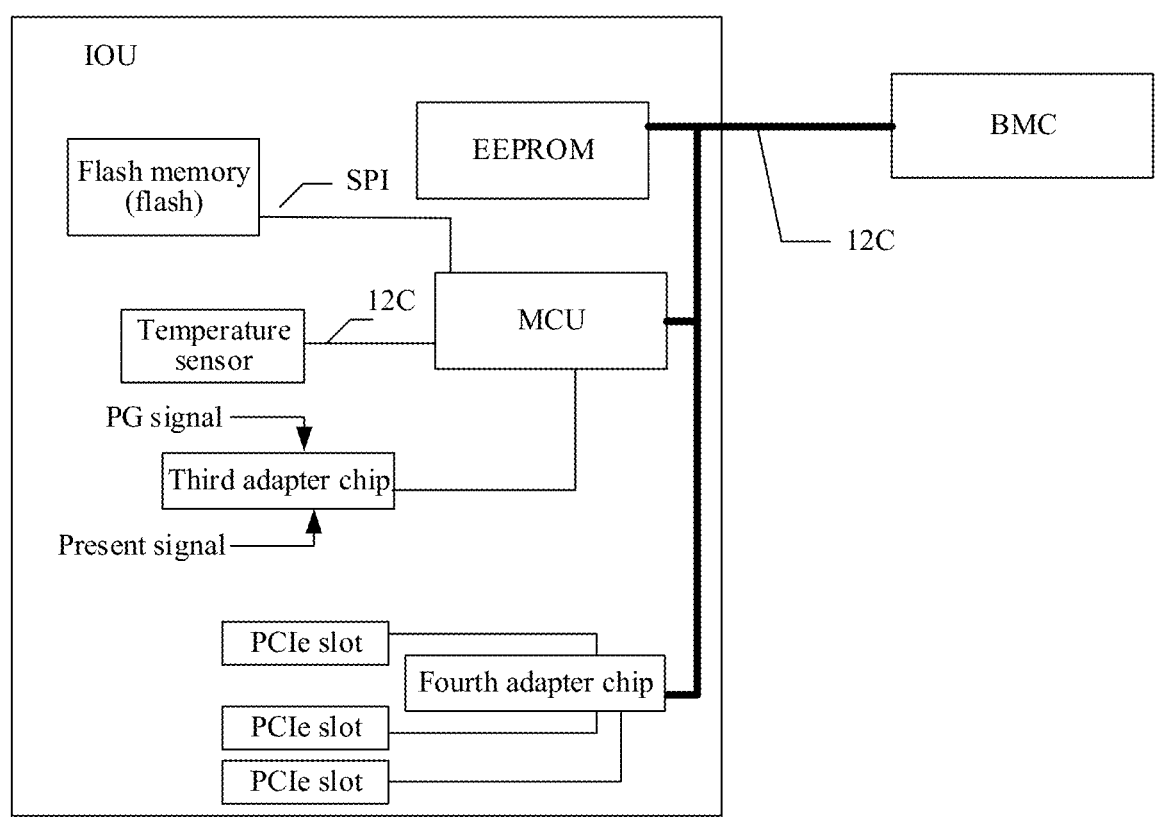

FIG. 6B shows a board management system according to an embodiment of this application. The board management system can be configured to implement out-of-band management of an I/O expansion unit. A BMC connects to an EEPROM and an MCU of the IOU through one I2C bus.

The EEPROM is configured to implement a function of the memory 110 in the foregoing embodiment, and stores management information of the IOU. The MCU is configured to implement a function of the SMC in the foregoing embodiment, for example, implement management and control of a component, processing of an upgrade command or a control command, and the like. The MCU connects to components such as a power supply of a temperature sensor, a power supply, and a PCIe slot. The MCU may obtain working information such as a temperature, and a PG signal and a present signal (the present signal may indicate whether a component is inserted into a connector) that are obtained through a first adapter chip.

By using a command word and by interacting with the BMC through the I2C bus, the MCU transfers working information of a component connected to the MCU. The BMC upgrades the MCU through the I2C bus. A standard PCIe card inserted into a PCIe slot (Slot) is directly connected to the I2C bus through the second adapter chip. Topological information in the IOU in the EEPROM describes a connection relationship between the standard PCIe card and the I2C bus. The BMC may directly manage the standard PCIe card.

Third type: A server board 100 is a storage unit (STU).

Figure 6C:
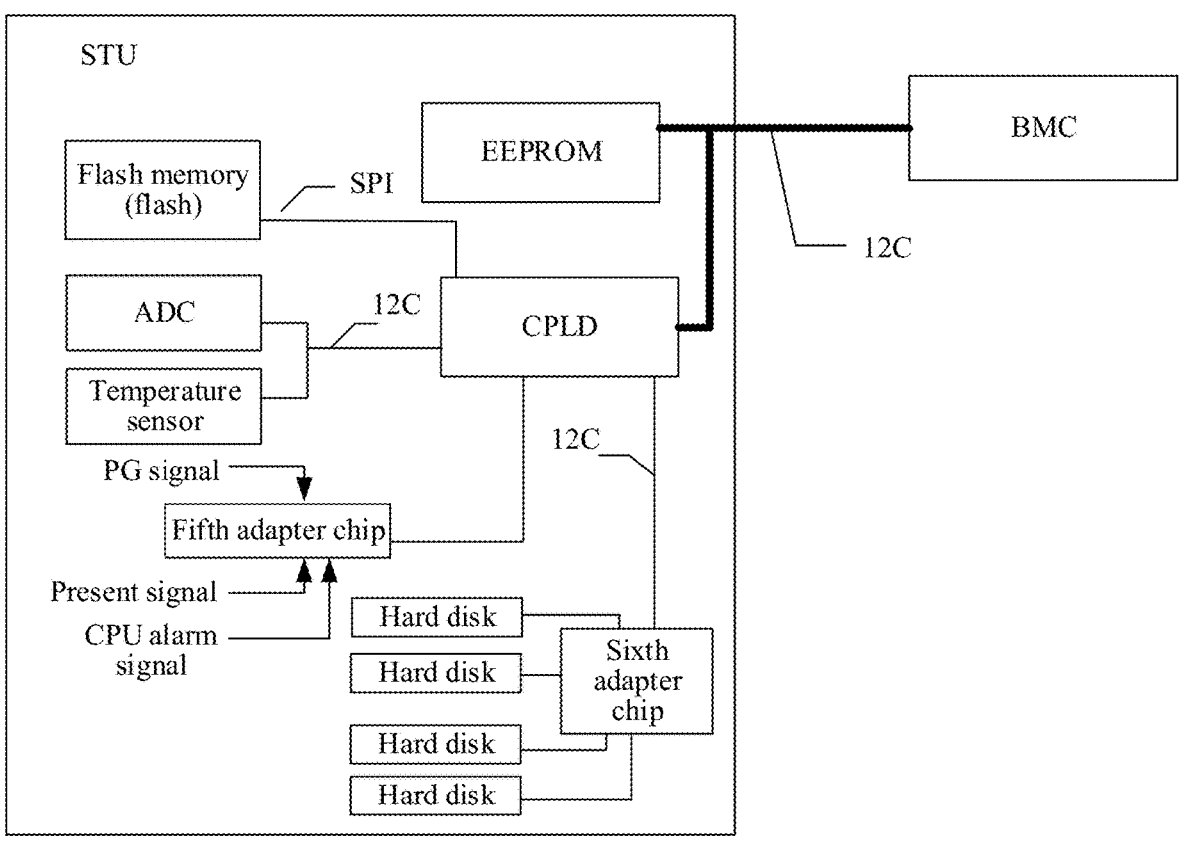

FIG. 6C shows a board management system according to an embodiment of this application. The board management system can be configured to implement out-of-band management of a storage expansion unit. A BMC connects to an EEPROM and a CPLD of the STU through one I2C bus. The EEPROM is configured to implement a function of the memory 110 in the foregoing embodiment, and stores management information of the storage unit, for example, property information of the storage unit. The CPLD is configured to implement a function of the SMC in the foregoing embodiment, for example, implement management and control of a component, and process an upgrade command or a control command. The CPLD is connected to components such as a temperature sensor, an ADC, and a hard disk. The CPLD may obtain a voltage, a temperature, and whether a hard disk is connected, and may further obtain working information such as a PG signal, a present signal, and a CPU alarm signal through a fifth adapter chip. The CPLD may further implement a function of hard disk management, and obtain working information of each hard disk through a sixth adapter chip. By using a command word and by interacting with the BMC through the I2C bus, the CPLD transfers working information of a component connected to the CPLD. The BMC may obtain working information of each hard disk on the board by using the command word. The BMC may further upgrade the CPLD through the I2C bus.

Figure 7:
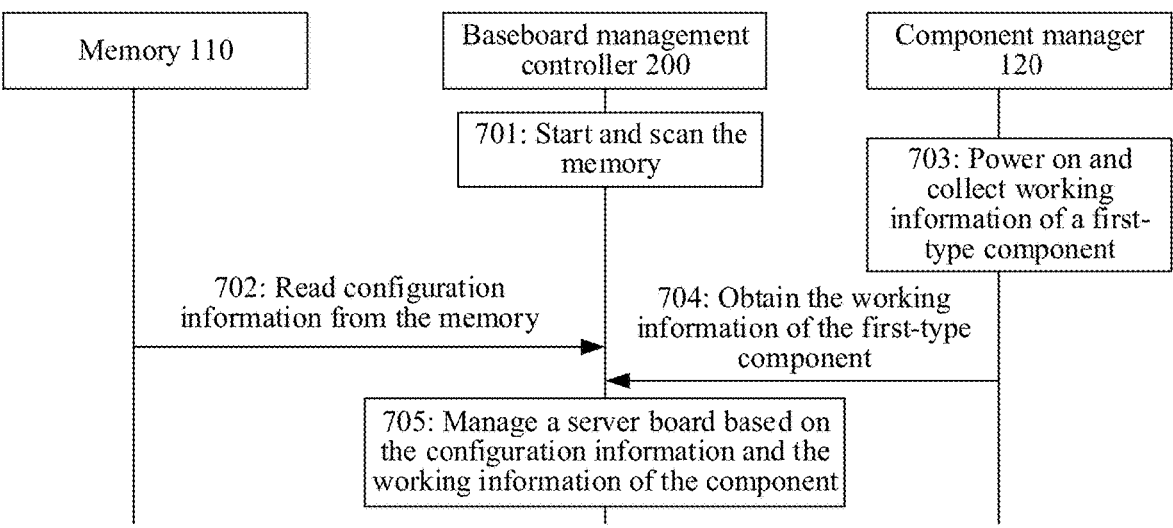
FIG. 7 is a schematic diagram of a board management method according to this application.

Based on the board management system provided above, the following describes a board management method according to an embodiment of this application. Refer to FIG. 7. The method includes the following steps.

Step 701: After being started, a baseboard management controller 200 performs scanning through the management bus 300, to find a memory 110 that is with a preset address and that is connected to the management bus 300.

After a server is powered on, the baseboard management controller 200 is started, and the baseboard management controller 200 may find, from components connected to the management bus 300, the memory 110 with the preset address through the management bus 300.

Step 702: After finding the memory 110, the baseboard management controller 200 reads management information of a server board 100 from the memory 110 through the management bus 300. For information included in the management information, refer to the descriptions of the foregoing content. The baseboard management controller 200 may learn of hardware information of the server board 100, topological information of the server board 100, and property information of a component on the server board 100 by reading the management information.

Step 703: After the server board 100 is powered on, a component manager 120 on the server board 100 collects working information of a first-type component.

After the server board 100 is powered on, the component manager 120 may interact with the first-type component connected to the component manager 120, to obtain the working information of the first-type component, for example, obtain a temperature detected by a temperature sensor, obtain a voltage detected by an ADC, and obtain power good information and component fault information (such as CPU alarm information) from voltage regulator controllers.

Step 704: The baseboard management controller 200 obtains the working information of the first-type component from the component manager 120. If the server board 100 includes a second-type component, the baseboard management controller 200 may further obtain working information of the second-type component from the second-type component through the management bus 300.

In step 704, the baseboard management controller 200 may collect the working information of the first-type component in the server through the component manager 120, or may obtain the working information of the second-type component through direct interaction. The baseboard management controller 200 obtains working information of a component in the server in a simple manner, without a need to be connected to each component on the server board 100.

Step 705: The baseboard management controller 200 manages the server board 100 based on the management information and the obtained working information of the component (for example, the working information of the first-type component and the working information of the second-type component).

The baseboard management controller 200 may obtain connection management information of the component on the server board 100 based on the management information, and may determine working environments (such as a temperature, a voltage, whether power is supplied, and whether a fault occurs) of some main components on the server board 100 based on the working information of the component. Based on this, the baseboard management controller 200 may determine whether to control the component on the server board 100, for example, start a fan or restart a power supply. The baseboard management controller 200 may send a control command to the component manager 120, to control the first-type component. The baseboard management controller 200 may further directly deliver a control command to the second-type component through the management bus 300, to control the second-type component. For a manner of delivering the control command, refer to the foregoing content. Details are not described herein again.

The baseboard management controller 200 may not only control the component, but also upgrade the component. For example, the baseboard management controller 200 may send an upgrade command to the component manager 120, to upgrade the first-type component. The baseboard management controller 200 may further send an upgrade command to the component manager 120, to upgrade the component manager 120. The baseboard management controller 200 may further directly deliver an upgrade command to the second-type component through the management bus 300, to upgrade the second-type component. For a manner of delivering the upgrade command, refer to the foregoing content. Details are not described herein again.

The baseboard management controller 200 may further determine whether to send an alarm to a user to prompt the user that a component is faulty, temperature is high, a power supply error occurs, or the like. In this way, the baseboard management controller 200 may manage the server board 100, thereby ensuring that the server board 100 can work normally, or keeping the user updated on status of the server board 100.

Figure 8:
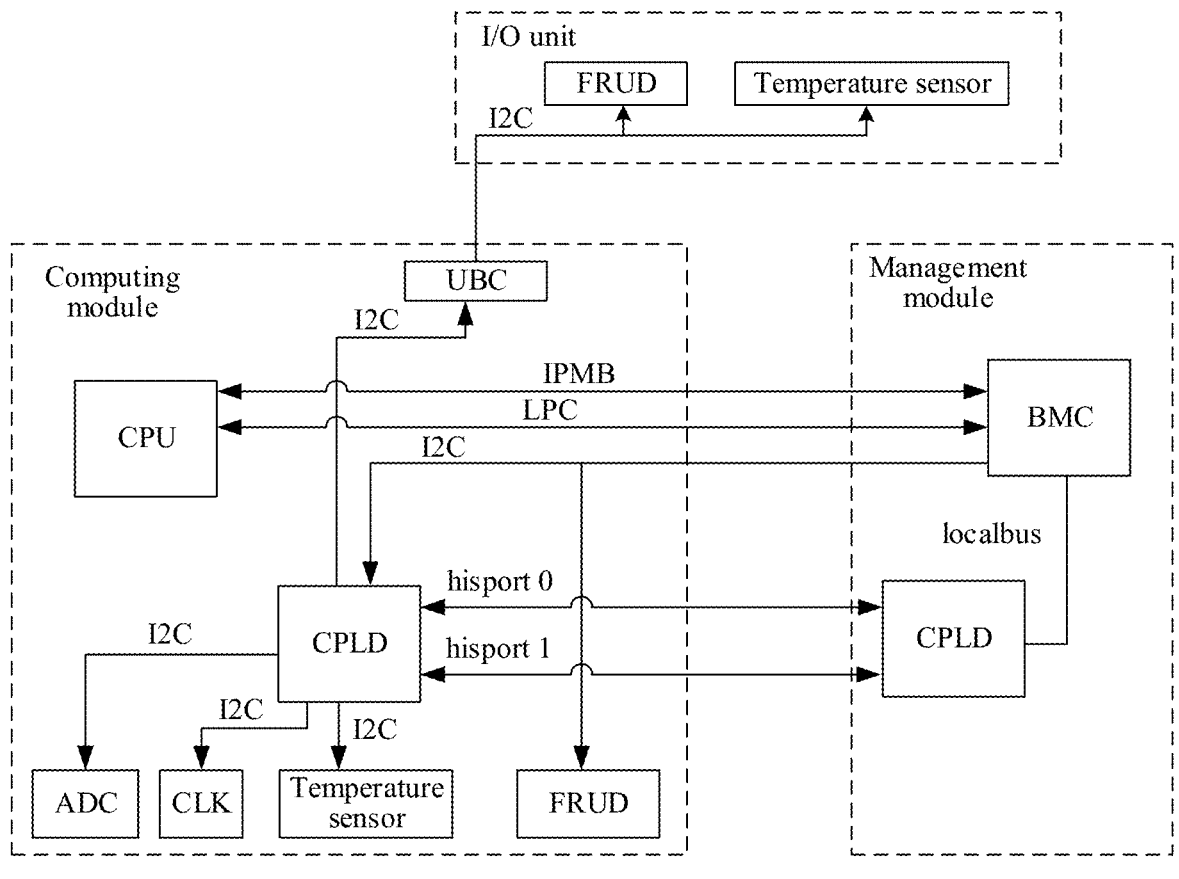
FIG. 8 is a schematic diagram of a structure of a BCU management system according to this application.

FIG. 8 shows a management system of a BCU module according to an embodiment of this application. The management system of the BCU module is configured to ensure a management feature of the BCU module.

The management feature of the BCU module includes an external management interface provided by the BCU module and a management feature of a management module for the BCU module.

A low-speed signal on an outbound high-speed connector of the BCU module includes a management signal. The low-speed signal may be used for out-of-band management of an outbound riser card connected to the BCU. This design eliminates the need for a low-speed management signal cable on the riser card.

The management module manages the BCU module in an out-of-band or an in-band mode. It is recommended, based on a TianChi management architecture, that an independent management feature on the BCU module be terminated on the BCU module. For example, a frequency synthesizer configured on the BCU module is directly loaded on the BCU module, without the need for independent management by the management module.

As shown in FIG. 8, a BMC on the management module provides one intelligent platform management bus (IPMB) interface to connect to a CPU of the BCU module. The intelligent platform management bus interface serves as an intelligent platform management interface (IPMI) bus channel.

The BMC on the management module provides one LPC interface to connect to the CPU of the BCU module. The LPC interface serves as a BT bus channel.

The BMC on the management module provides one I2C interface to connect to a CPLD and an FRUD of the BCU module. The BMC implements basic out-of-band management of the BCU module through the I2C interface, including reading information from the FRUD and accessing a CPLD register of the BCU module by using the I2C interface as an SMC bus channel.

A CPLD chip on the management module provides two hisport interfaces to connect to the CPLD of the BCU module. One interface, that is, a hisport 0, is used as a channel for interaction between logic registers of the BCU module and the management module, and the other interface is used as a hisport over I2C interface for the BCU module to manage external expansion.

The CPLD chip on the BCU module provides a plurality of I2C interfaces for reading and configuring information about an ADC chip, a clock frequency synthesizer chip, and a temperature sensor chip of the BCU module. That is, the CPLD on the BCU module reads basic information such as temperature and voltage and reports the information to a BMC chip through a unified SMC interface. In this way, the independent management feature is terminated inside the BCU module.

The CPLD chip on the BCU module provides a plurality of I2C interfaces to connect to a UBC high-speed connector. The I2C interfaces serve as a management channel for external module expansion. These external I2C management interfaces are based on a hisport over I2C feature provided by the management module. The management channel may connect to a component subject to out-of-band management, such as an FRU chip and a temperature sensor on the riser card, to implement an out-of-band management feature of the component.

Figure 9:
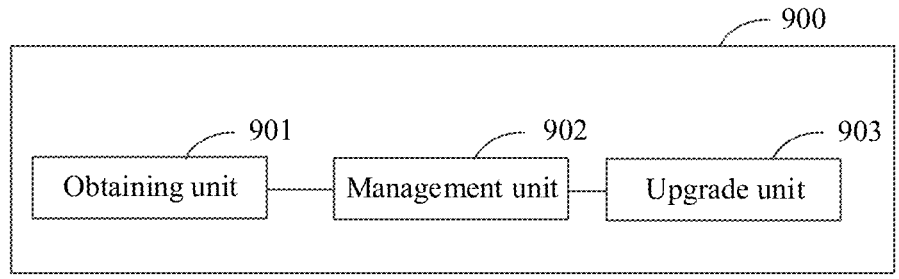
FIG. 9 is a schematic diagram of a structure of a board management apparatus according to this application.

Based on a same inventive concept as the method embodiment, this embodiment of this application further provides a board management apparatus. The board management apparatus is configured to perform the method performed by the baseboard management controller in the method embodiment shown in FIG. 7. For related features, refer to the foregoing method embodiment. Details are not described herein again. As shown in FIG. 9, a board management apparatus 900 includes an obtaining unit 901 and a management unit 902.

The obtaining unit 901 is configured to obtain management information from a memory through a management bus.

The management unit 902 is configured to interact with a component manager based on the management information through the management bus, to manage a computing device board.

In a possible implementation, the computing device board includes a first-type component, the component manager is connected to the first-type component, and the obtaining unit 901 may obtain working information of the first-type component from the component manager through the management bus.

In a possible implementation, the computing device board includes a second-type component, the second-type component is connected to a baseboard management controller through the management bus, and the obtaining unit 901 may obtain working information of the second-type component from the second-type component through the management bus.

In a possible implementation, the management information includes a part or all of the following: property information of the computing device board, topological information of the computing device board, property information of the first-type component, and property information of the second-type component.

In a possible implementation, when interacting with the component manager through the management bus, the management unit 902 may interact by using a command word.

In a possible implementation, the apparatus further includes an upgrade unit 903. The upgrade unit 903 may transfer an upgrade file for the first-type component to the component manager, to indicate to upgrade the first-type component. The upgrade unit 903 may further transfer an upgrade file for the component manager to the component manager, to indicate to upgrade the component manager.

In a possible implementation, the management bus is an I2C bus or an SPI bus.

It should be noted that, in embodiments of this application, division into the units is an example, and is merely a logical function division. In actual implementation, another division manner may be used. Functional units in embodiments of this application may be integrated into one processing unit, or each unit may exist alone physically, or two or more units may be integrated into one module. The integrated unit may be implemented in a form of hardware, or may be implemented in a form of a software functional module.

Figure 10:
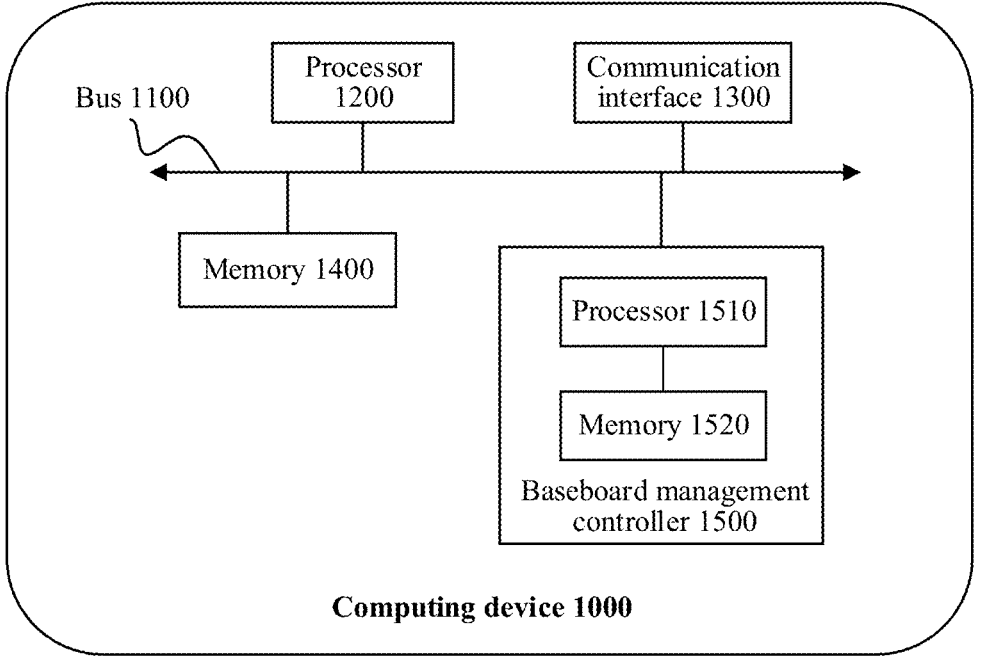
FIG. 10 is a schematic diagram of a structure of a computing device according to this application.

This application further provides a computing device 1000 shown in FIG. 10. The computing device 1000 includes a computer board and a baseboard management controller 1500. The computer board may include a bus 1100, a processor 1200, a communication interface 1300, and a memory 1400. The processor 1200, the memory 1400, and the communication interface 1300 communicate with each other through the bus 1100.

The processor 1200 may be a central processing unit (CPU), an application-specific integrated circuit (ASIC), a field programmable gate array (FPGA), an artificial intelligence (AI) chip, a system on chip (SoC) or a complex programmable logic device (CPLD), a graphics processing unit (GPU), or the like.

The memory 1400 may include a volatile memory (volatile memory), for example, a random access memory (RAM). The memory 1400 may alternatively include a non-volatile memory (non-volatile memory), for example, a read-only memory (ROM), a flash memory, an HDD, or an SSD. The memory 1400 may further include the memory 110 mentioned in the foregoing content, that is, the memory 1400 may store management information. The memory

1400 may further store a software module required for another running process such as an operating system. The operating system may be Linux™, Unix™, Windows™, or the like.

The baseboard management controller 1500 includes a processor 1510 and a memory 1520. The memory 1520 stores computer program code, and the processor 1510 executes the computer program code to perform the method described in FIG. 7. Alternatively, the baseboard management controller 1500 may include only the processor 1510. Computer program code is burnt on the processor 1510, and the processor 1510 may perform the method described in FIG. 7.

The descriptions of the processes corresponding to the accompanying drawings have respective focuses. For a part that is not described in detail in a process, refer to related descriptions of another process.

The foregoing embodiments may be wholly or partially implemented by using software, hardware, firmware, or any combination thereof. When software is used to implement the embodiments, the embodiments may be wholly or partially implemented in a form of a computer program product. The computer program product includes computer program instructions. When the computer program instructions are loaded and executed on a computer, processes or functions in FIG. 7 according to embodiments of the present invention are wholly or partially generated.

The foregoing embodiments may be wholly or partially implemented by using software, hardware, firmware, or any combination thereof. When implemented by using software, the foregoing embodiments may be implemented wholly or partially in a form of a computer program product. The computer program product includes one or more computer instructions. When the computer program instructions are loaded or executed on a computer, processes or the functions according to embodiments of this application are wholly or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

Clearly, a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A board management system, comprising a baseboard management controller and a computing device board, wherein:

the computing device board comprises a memory and a component manager, the memory records management information of the computing device board, wherein the management information comprises property information of the computing device board, topological information of the computing device board, and property information of devices on the computing device board, wherein the topological information of the computing device board describes connection relationship of the devices on the computing device board, and the memory and the component manager are connected to the baseboard management controller through a management bus; and the baseboard management controller is configured to:

obtain the management information from the memory; and manage the computing device board based on the management information by interacting with the component manager.

2. The system according to claim 1, wherein the computing device board further comprises a first-type component, the first-type component is connected to the component manager, and the baseboard management controller is configured to:

obtain working information of the first-type component from the component manager through the management bus.

3. The system according to claim 1, wherein the computing device board further comprises a second-type component, and the second-type component is connected to the baseboard management controller through the management bus; and wherein:

the baseboard management controller is further configured to obtain working information of the second-type component through the management bus.

4. The system according to claim 1, wherein the baseboard management controller interacts with the component manager by using a command word.

5. The system according to claim 2, wherein the baseboard management controller is further configured to transfer an upgrade file for the first-type component to the component manager, to indicate to upgrade the first-type component; and the component manager is configured to:

obtain the upgrade file for the first-type component; and upgrade the first-type component by using the upgrade file for the first-type component.

6. The system according to claim 1, wherein the memory is an electrically erasable programmable read-only memory (EEPROM).

7. The system according to claim 1, wherein the component manager is a complex programmable logic device (CPLD) or a microcontroller unit (MCU).

8. The system according to claim 1, wherein the management bus is an inter-integrated circuit (I2C) bus or a serial peripheral interface (SPI) bus.

9. A board management method for managing a computing device board, the computing device board comprises a memory and a component manager, and the memory records management information of the computing device board; and wherein the method comprises:

obtaining, by a baseboard management controller, the management information from the memory through a management bus; and interacting, by the baseboard management controller, with the component manager based on the management information through the management bus, to manage the computing device board, wherein the management information comprises property information of the computing device board, topological information of the computing device board, and property information of devices on the computing device board, wherein the topological information of the computing device board describes connection relationship of the devices on the computing device board.

10. The method according to claim 9, wherein the computing device board comprises a first-type component, and the method comprises:

obtaining, by the baseboard management controller, working information of the first-type component from the component manager through the management bus.

11. The method according to claim 9, wherein the computing device board comprises a second-type component, and the method comprises:

obtaining, by the baseboard management controller, working information of the second-type component from the second-type component through the management bus.

12. The method according to claim 9, wherein the interacting, by the baseboard management controller, with the component manager through the management bus comprises:

interacting, by the baseboard management controller, with the component manager through the management bus by using a command word.

13. The method according to claim 10, wherein the method further comprises:

transferring, by the baseboard management controller, an upgrade file for the first-type component to the component manager, to indicate to upgrade the first-type component.

14. The method according to claim 9, wherein the management bus is an (I2C) bus or a serial peripheral interface (SPI) bus.

15. An apparatus, wherein the apparatus is configured to manage a computing device board, the computing device board comprises a memory and a component manager, and the memory records management information of the computing device board; and wherein the apparatus comprises:

at least one processor; and at least one non-transitory computer readable medium storing a program to be executed by the at least one processor, wherein the program comprises instructions that when executed by the at least one processor, cause the apparatus to perform operations comprising:

obtaining the management information from the memory through a management bus; and interacting with the component manager based on the management information through the management bus, to manage the computing device board, wherein the management information comprises property information of the computing device board, topological information of the computing device board, and property information of devices on the computing device board, wherein the topological information of the computing device board describes connection relationship of the devices on the computing device board.

16. The apparatus according to claim 15, wherein the computing device board comprises a first-type component, and the operations further comprise:

obtaining working information of the first-type component from the component manager through the management bus.

17. The apparatus according to claim 15, wherein the computing device board comprises a second-type component, and the operations further comprise:

obtaining working information of the second-type component from the second-type component through the management bus.

* * * * *